United States Patent
Bonen et al.

(10) Patent No.: US 10,877,693 B2
(45) Date of Patent: Dec. 29, 2020

(54) ARCHITECTURE FOR DYNAMIC TRANSFORMATION OF MEMORY CONFIGURATION

(71) Applicant: Intel Corporation, Santa Clara, CA (US)

(72) Inventors: Nadav Bonen, Ofer Z (IL); Julius Mandelblat, Haifa (IL); Nir Sucher, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 16/024,637

(22) Filed: Jun. 29, 2018

(65) Prior Publication Data
US 2019/0042157 A1 Feb. 7, 2019

(51) Int. Cl.
*G06F 12/00* (2006.01)
*G06F 12/08* (2016.01)
(Continued)

(52) U.S. Cl.
CPC .......... *G06F 3/0659* (2013.01); *G06F 3/065* (2013.01); *G06F 3/0619* (2013.01);
(Continued)

(58) Field of Classification Search
CPC ..... G06F 3/0619; G06F 3/0625; G06F 3/0644
(Continued)

(56) References Cited

U.S. PATENT DOCUMENTS 5,701,516 A * 12/1997 Cheng ................ G06F 12/0866
710/22
6,256,252 B1 7/2001 Arimoto
(Continued)

FOREIGN PATENT DOCUMENTS

WO 2012095404 6/2012

OTHER PUBLICATIONS

Bhat, Srivasta S., mm: Memory Power Management, Sep. 26, 2013 5 pages, [LWN.net].
(Continued)

*Primary Examiner* — Mohamed M Gebril
(74) *Attorney, Agent, or Firm* — Green, Howard & Mughal LLP

(57) ABSTRACT

One embodiment provides an apparatus. The apparatus includes first memory controller circuitry to control read and/or write access to first memory circuitry via a first conductive bus. The apparatus includes second memory controller circuitry to control read and/or write access to second memory circuitry via a second conductive bus. The apparatus includes power control circuitry coupled to the first memory controller circuitry and the second memory controller circuitry. The power control circuitry transfers data from the second memory circuitry with the second memory controller circuitry via the second conductive bus to the first memory circuitry with the first memory controller circuitry via the first conductive bus. The power control circuitry powers down the second memory circuitry after the transfer of the data from the second memory circuitry to the first memory circuitry. The power control circuitry decreases power consumption of the apparatus and may increase batter life of the apparatus.

16 Claims, 19 Drawing Sheets

(51) Int. Cl.
*G06F 13/00* (2006.01)
*G06F 3/06* (2006.01)
*G06F 13/40* (2006.01)
*G06F 13/16* (2006.01)

(52) U.S. Cl.
CPC .......... *G06F 3/0625* (2013.01); *G06F 3/0644* (2013.01); *G06F 3/0647* (2013.01); *G06F 3/0673* (2013.01); *G06F 13/1668* (2013.01); *G06F 13/4068* (2013.01)

(58) Field of Classification Search
USPC ........................................................ 711/105
See application file for complete search history.

(56) References Cited

U.S. PATENT DOCUMENTS

| | | | | |
|---|---|---|---|---|
| 6,418,510 | B1* | 7/2002 | Lamberts | G06F 3/0611 |
| | | | | 710/43 |
| 7,269,709 | B2* | 9/2007 | Kelly | G06F 13/1684 |
| | | | | 711/168 |
| 8,751,766 | B2* | 6/2014 | Inoue | G06F 3/0619 |
| | | | | 711/103 |
| 2008/0005516 | A1* | 1/2008 | Meinschein | G06F 1/3225 |
| | | | | 711/165 |
| 2008/0031030 | A1 | 2/2008 | Rajan et al. | |
| 2008/0043562 | A1 | 2/2008 | Totolos et al. | |
| 2008/0133654 | A1* | 6/2008 | Kim | H04L 69/162 |
| | | | | 709/203 |
| 2008/0307240 | A1* | 12/2008 | Dahan | G06F 1/06 |
| | | | | 713/320 |
| 2011/0231710 | A1* | 9/2011 | Laor | G06F 11/366 |
| | | | | 714/38.11 |
| 2011/0258354 | A1* | 10/2011 | Wang | G06F 13/161 |
| | | | | 710/114 |
| 2012/0054541 | A1* | 3/2012 | Byom | G06F 11/0793 |
| | | | | 714/6.13 |
| 2012/0173817 | A1* | 7/2012 | Jiang | H04L 12/1877 |
| | | | | 711/115 |
| 2012/0216059 | A1 | 8/2012 | Barth et al. | |
| 2014/0215129 | A1* | 7/2014 | Kuzmin | G06F 12/0246 |
| | | | | 711/103 |
| 2015/0067091 | A1* | 3/2015 | Das | G06F 3/0655 |
| | | | | 709/213 |
| 2015/0113224 | A1* | 4/2015 | Achilles | G06F 12/0891 |
| | | | | 711/135 |
| 2015/0186074 | A1* | 7/2015 | Benisty | G06F 3/0659 |
| | | | | 711/115 |
| 2015/0347264 | A1* | 12/2015 | Mohammed | H04L 67/10 |
| | | | | 714/45 |
| 2016/0026406 | A1* | 1/2016 | Hahn | G06F 3/0656 |
| | | | | 711/103 |
| 2016/0070336 | A1* | 3/2016 | Kojima | G06F 1/263 |
| | | | | 711/103 |
| 2016/0094339 | A1* | 3/2016 | Agarwal | H04K 1/00 |
| | | | | 711/164 |
| 2016/0179674 | A1* | 6/2016 | Sury | G06F 12/0822 |
| | | | | 711/141 |
| 2017/0125070 | A1* | 5/2017 | Hadar | G11C 5/148 |
| 2017/0206031 | A1* | 7/2017 | Yin | G06F 12/00 |
| 2018/0074973 | A1* | 3/2018 | Chan | G06F 11/00 |
| 2019/0042157 | A1* | 2/2019 | Bonen | G06F 3/0644 |
| 2019/0052270 | A1* | 2/2019 | Huddar | G06F 13/4068 |
| 2019/0114432 | A1* | 4/2019 | Tang | G06F 21/81 |
| 2019/0129850 | A1* | 5/2019 | Chang | G06F 12/0246 |

OTHER PUBLICATIONS

International Search Report and Written Opinion from related matter PCT/US2019/034737 dated Sep. 20, 2019.

* cited by examiner

```
                                    ┌─ 400
OS initiates operations to transform main memory to half memory channels
configuration, OS pages out LRU pages such that half or less of memory is occupied,
and consolidates pages into half or less of the number of segments  402
                              │
                              ▼
OS requests initiation of transformation to half memory channels
                    configuration  404
                              │
                              ▼
                    Request          No
                   acceptable? ──────────▶ Report Error  408
                      406
                     │ Yes
                     ▼
Provide indication that transformation to half of memory channels
configuration is in progress, and initiate transformation through
                         DMA  410
                              │
                              ▼
DMA copy data from occupied segments of source channels to
vacant (remapped) segments of target channels and
transactions to the source channels are routed to the remapped
           segments of target channels  412
                              │
                              ▼
DMA report transformation completion to power control circuitry
                             414
                              │
                              ▼
Clear indication that transformation to the half of
channels configuration is in progress, and power
          down source channels  416
```

FIG.4

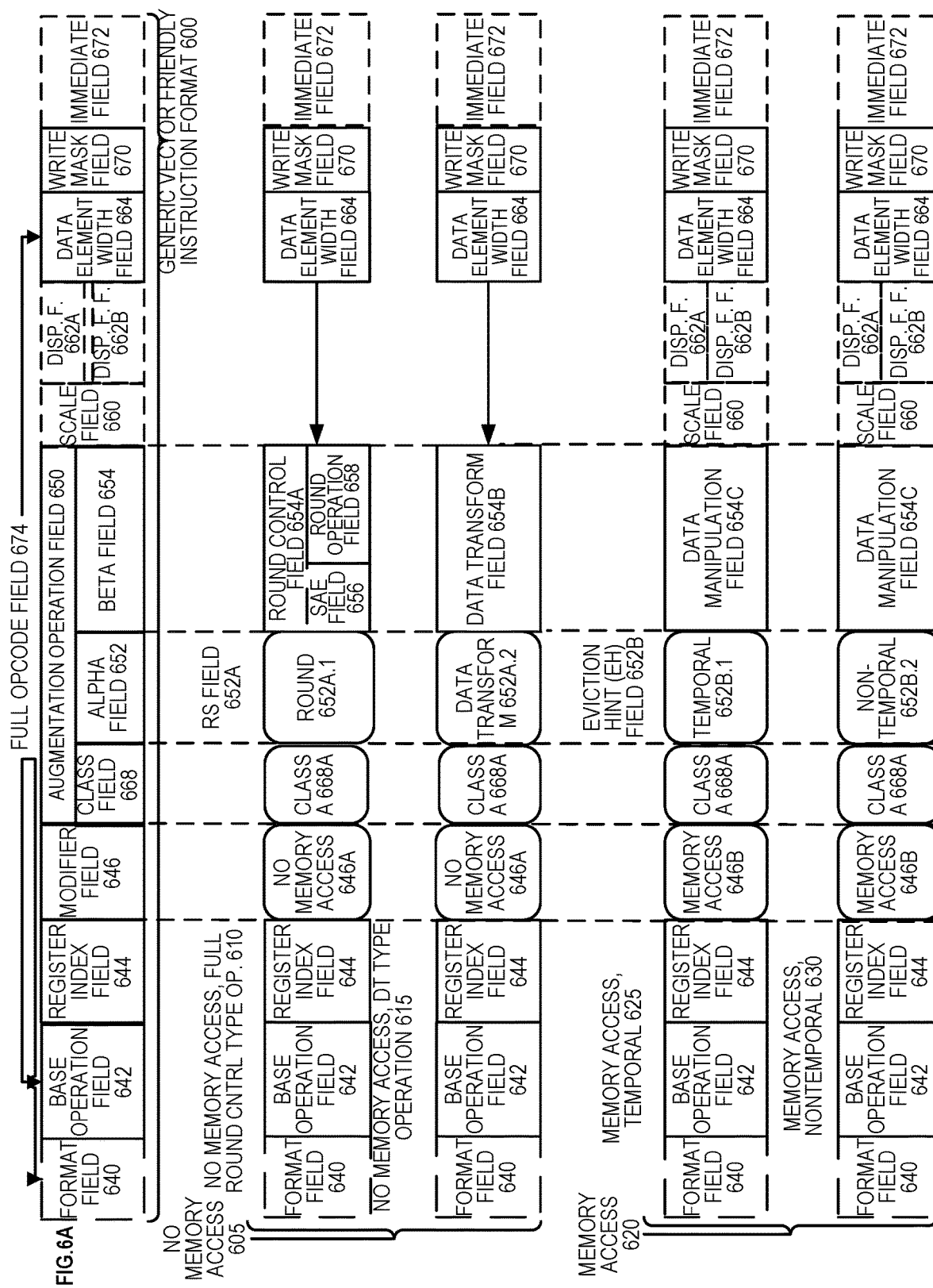

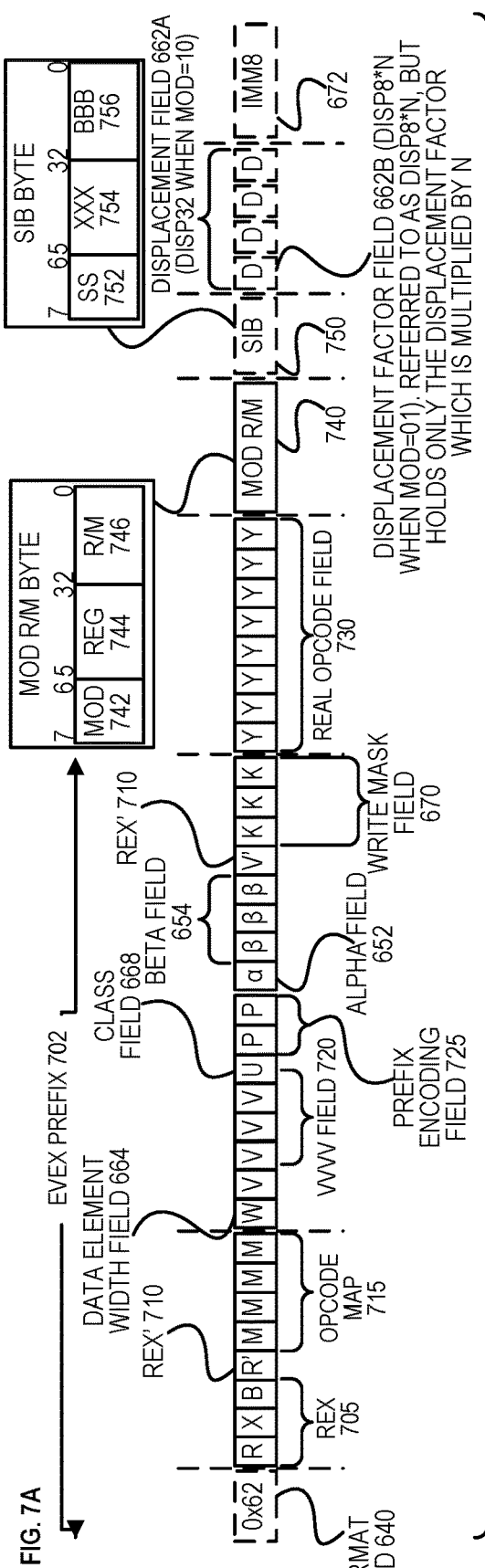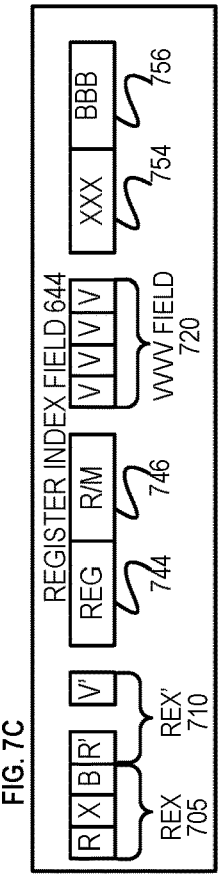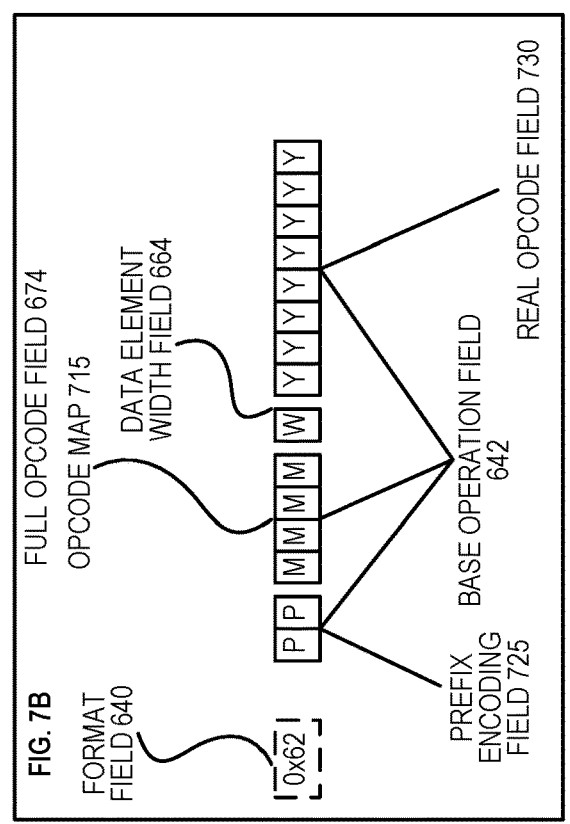

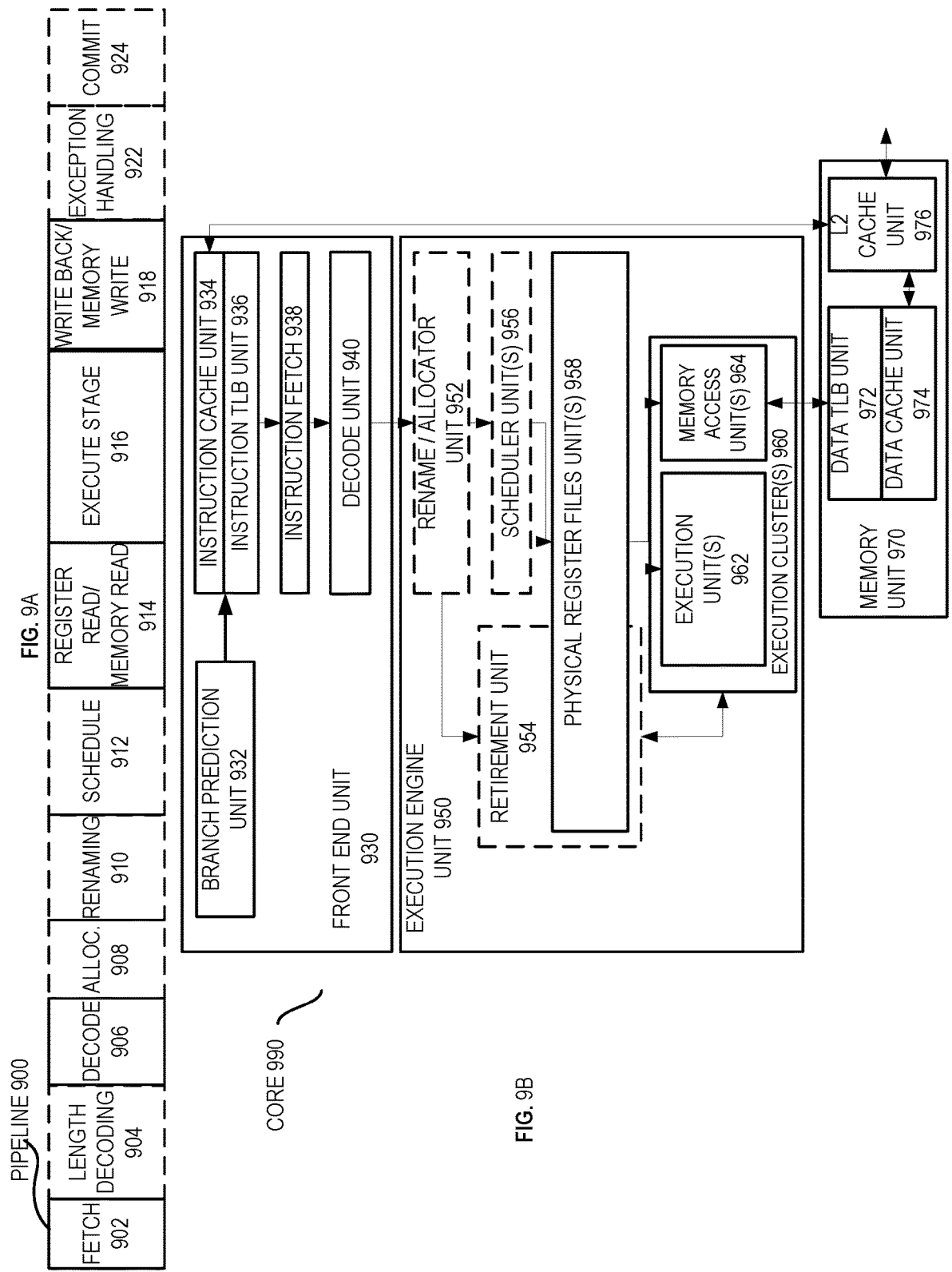

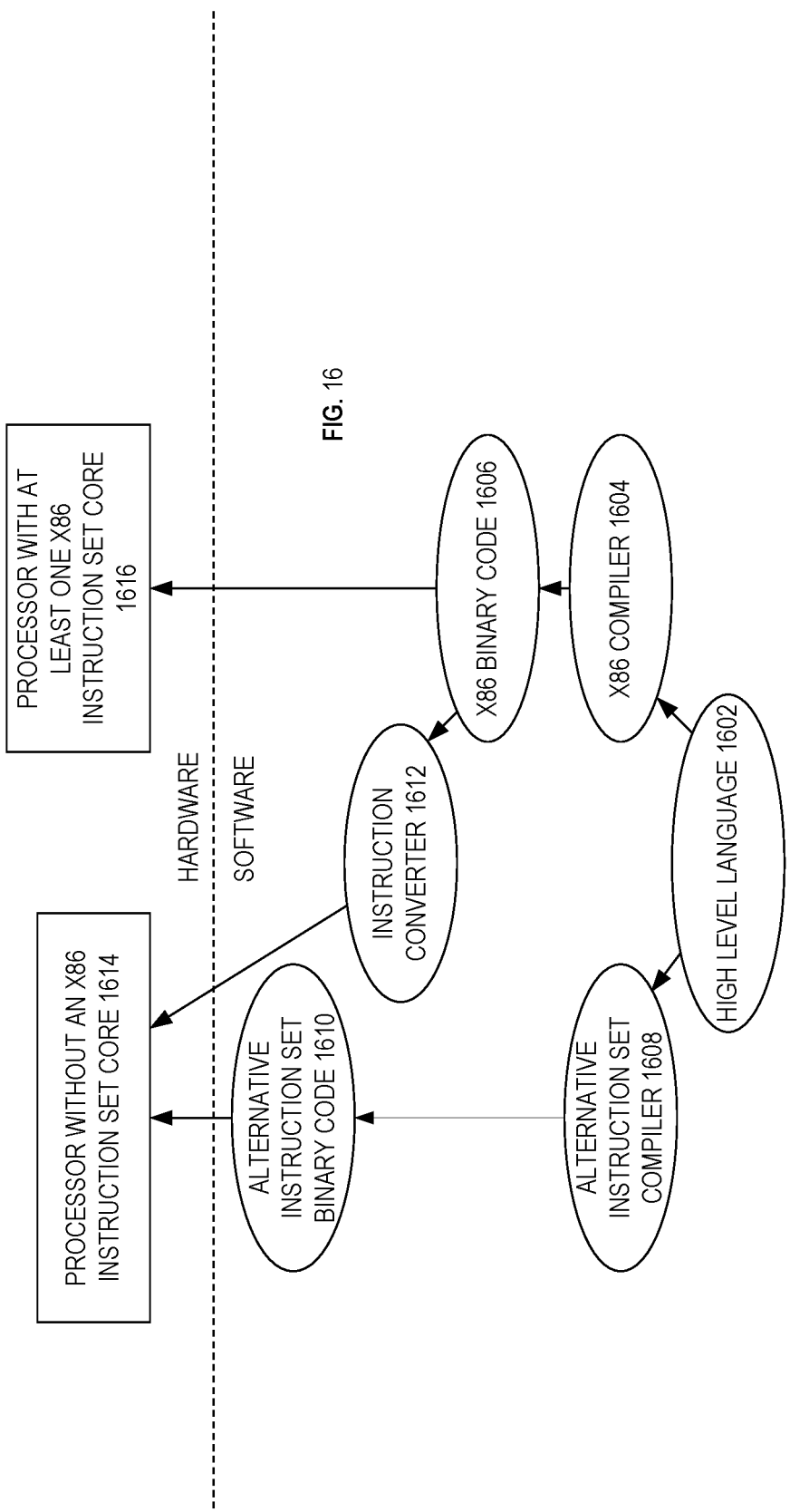

ARCHITECTURE FOR DYNAMIC TRANSFORMATION OF MEMORY CONFIGURATION

FIELD

The present disclosure relates to memory configuration, in particular to, architecture for dynamic transformation of memory configuration.

BACKGROUND

Battery life substantially defines the convenience of mobile computing devices. Mobile devices with longer battery lives allow uses to remain virtually tethered to their network while being physically mobile. However, when a mobile computing device has a short battery life, users attempt to extend the battery life through a series of inconvenient operations, such as, dimming a screen, entering low-power mode, slowing down processors, turning off features, turning off the mobile device, and the like. A conflicting goal of device and software manufacturers is to allow users of mobile computing devices to enjoy the features provided by the mobile computing devices, while providing a battery life that enables convenient use of the mobile computing device.

One of the computer components that draws power from a battery, both during low power operations and power-intensive operations, is the main memory of the mobile computing device. The main memory typically refers to random access memory (RAM) that draws power by being regularly refreshed or repowered to preserve data. Main memory is used by a processor to store information, e.g., related to applications, data, and fundamental operations of the mobile computing device. Since both capacity and bandwidth of memory has increased significantly over the years, many mobile computing devices have much more main memory capacity than is needed for simple operations or uses. Because of the main memory capacity and the power drawn by the greater quantities of main memory, some mobile computing devices struggle to keep up with the battery life capabilities of smaller, thinner, and less powerful electronics (e.g., tablets). This may cause users to buy supplementary electronic devices, despite the ability of mobile computing devices to provide the same features (and more) as the supplementary electronic devices.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 4 is a flowchart of dynamically transforming main memory from a dual-channel or multi-channel configuration to a single-channel configuration according to various embodiments of the present disclosure;

FIGS. 6A-6B are block diagrams illustrating a generic vector friendly instruction format and instruction templates thereof according to embodiments of the disclosure;

FIGS. 7A-D are block diagrams illustrating an exemplary specific vector friendly instruction format according to embodiments of the disclosure;

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure;

FIG. 16 is a block diagram contrasting the use of a software instruction converter to convert binary instructions in a source instruction set to binary instructions in a target instruction set according to embodiments of the disclosure.

Figure 1A:
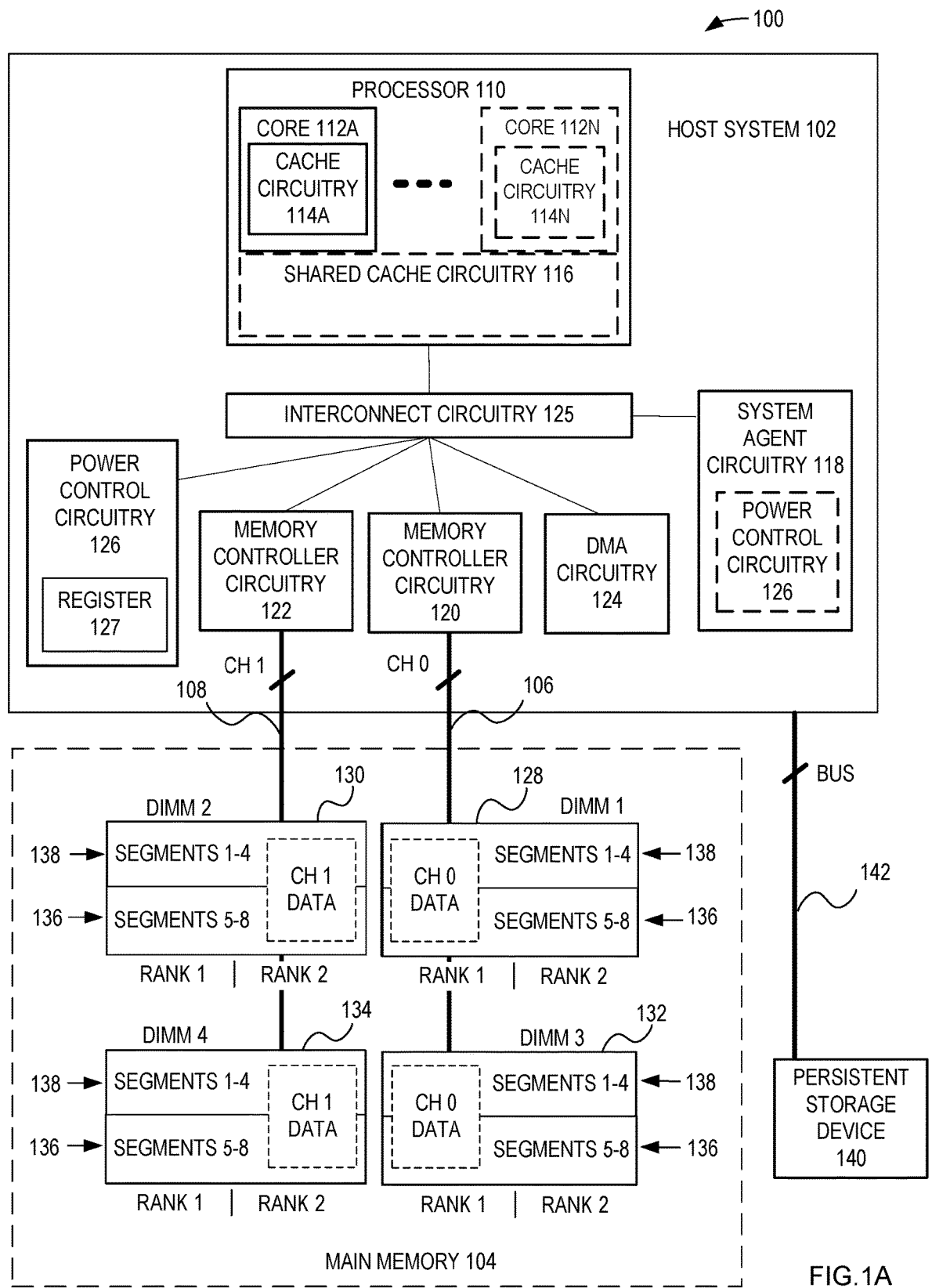
FIGS. 1A and 1B illustrate a functional block diagram of a computing system having a host system that may reduce power consumption of the computing system by dynamically consolidating and/or reconfiguring main memory consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Disclosed herein is a computing system configured to reduce power consumption by dynamically consolidating memory to enable powering down portions of memory of the computing system, consistent with several embodiments of the present disclosure.

Several factors influence the amount of power used by a computing system. Some of the factors include powering fans to keep processors cool, powering processors to enable computational operations, and refreshing memory to support processor operations. With limitless supplies of power, many of these factors become a non-issue. However, when attempting to extend battery life, to decrease power consumption, or to decrease heat dissipated by computing system operations, reducing the amount of power consumed by a computing system can be a desirable goal.

The present disclosure generally relates to decreasing power consumption by allowing a computing system to power down portions of memory, for example, when the performance trade-off is acceptable (e.g., video playback instead of video streaming). Typically, the memory that is most used by a processor in a computing system is referred to as main memory, which can be quickly written to and read from. This main memory is generally non-persistent memory, which loses data when power is removed and/or when the information stored by the main memory is not refreshed. Refreshing main memory includes periodically applying power to memory cells (e.g., capacitors) within the main memory to ensure that the data stored in the memory cells can be correctly read when needed. Even when the computing system is placed in a low-power or standby mode, main memory is still refreshed so that the computing system can quickly resume prior operations. However, even in standby mode, the main memory continues to draw a quantity power that is proportional to the idle power of the memory and the capacity of the memory. Because some operations of the computing system may be performed with significantly less (e.g., half or less) than the full capacity of the main memory, embodiments of the present disclosure enable a computing system to dynamically consolidate memory and reduce power consumption by not accessing a physical memory channel, by not refreshing memory associated with a powered down memory channel, by powering off a memory controller for the powered down memory channel, and by powering off portions of a physical circuitry (PHY) within the system on a chip (SoC) of a processor package.

In one embodiment, a computing system includes main memory that is operated with two or more channels. To dynamically consolidate the main memory, segments (or portions) of the main memory are identified. Within the segments of the main memory, less important (e.g., less used) pages of memory are paged out (i.e., transferred/stored to persistent memory), and more important pages of memory are consolidated into a reduced quantity (e.g., one, two, or half) of segments of the main memory. Power control circuitry is then configured to methodically move data that is dispersed among multiple channels, memory circuitry, and/or ranks of memory circuitry onto a single channel, a single set of memory circuitry, and/or a single rank, according to one embodiment. The portions of the main memory associated with unused channels may then be powered down or cease to be refreshed, to reduce the amount of power consumed by the main memory.

Some prototyped implementations of the present disclosure have been shown to increase the standby mode battery life of a mobile computing device from 7.2 days to 8.5 days (i.e., by approximately 18%). In non-standby modes, the dynamic consolidation of main memory may enable continued computational operations while concurrently decreasing power consumption by 3.8% to 10.8%, according to various implementations (e.g., during video playback operations).

Figure 1B:
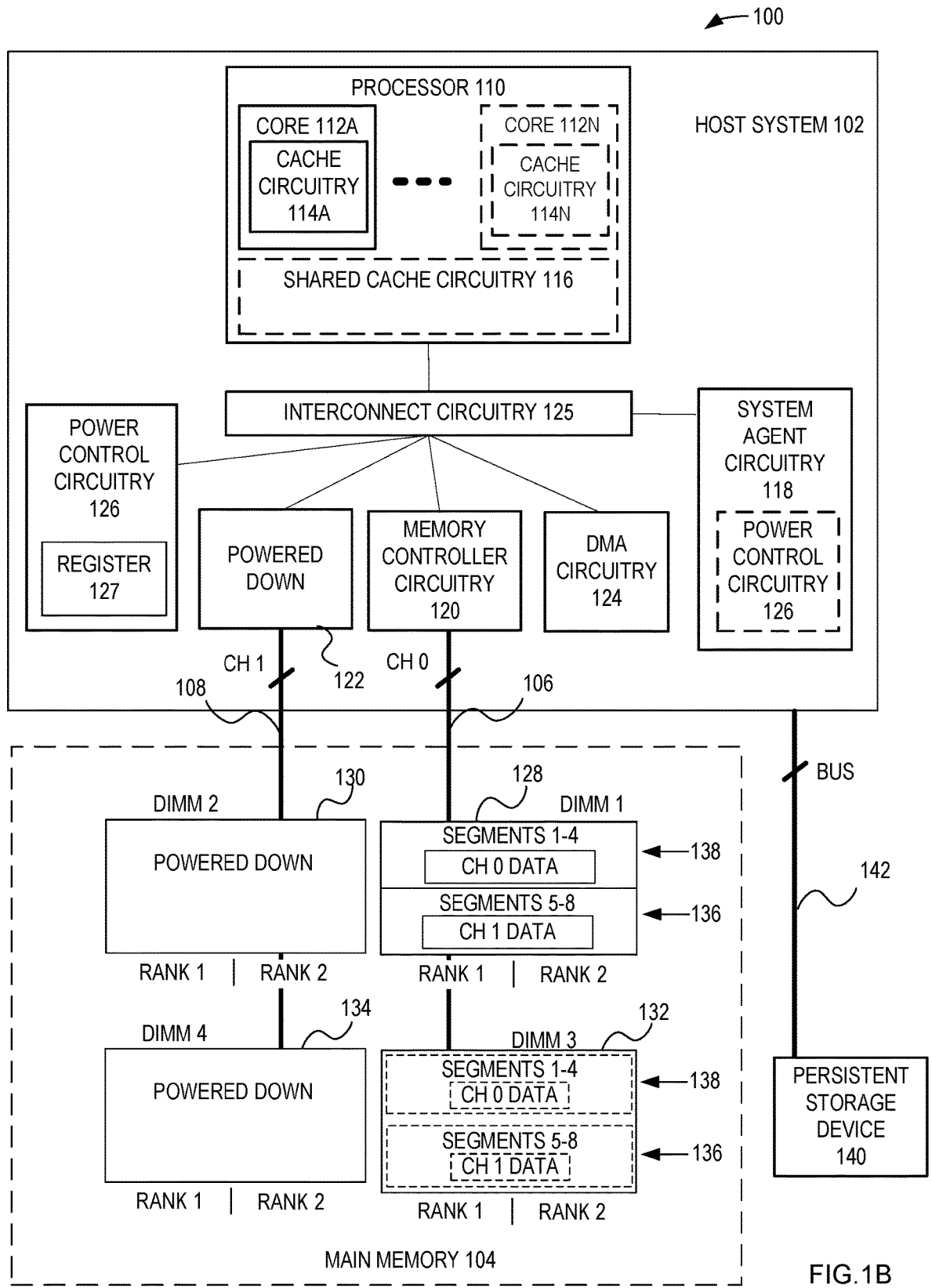

FIGS. 1A and 1B illustrate a block diagram of a computing system 100 having a system host 102 that can reduce power consumption of the computing system 100 by dynamically consolidating and/or reconfiguring main memory, consistent with several embodiments of the present disclosure. The system host 102 may be a system on a chip (SOC) and is one example implementation of SOC 1500 of FIG. 15, as described herein. The computing system 100 includes system host 102 configured to store and retrieve memory pages and cache lines to/from main memory 104 via a communication channel 106 and a communication channel 108. The communication channels 106 and 108 are conductive buses or point-to-point interconnects that include traces for data, control, and/or power. The system host 102 includes one or more components that enable the system host 102 to dynamically transform the configuration of the main memory 104 to reduce power consumption of the computing system 100.

The system host 102 includes a processor 110 which includes one or more cores 112A-N, one or more cache circuitry 114A-N, and shared cache circuitry 116; system agent circuitry 118; memory controller circuitry 120 for the communication channel 106; memory controller circuitry 122 for the communication channel 108; direct memory access (DMA) circuitry 124; power control circuitry 126; and interconnect circuitry 125 that physically and communicatively interconnects the components of the system host 102, according to an embodiment. The one or more cores 112A-N perform computational operations on data. The one or more cache circuitry 114A-N and the shared cache circuitry 116 represent different levels of low-latency memory that stores data to support computational operations by the one or more cores 112A-N. The system agent circuitry 118 manages power to the processor 110 and may manage self-refresh and clock enablement of the main memory 104. The memory controller circuitry 120 controls read and write access to the memory circuitry that is connected to the communication channel 106. The memory controller circuitry 122 controls read and write access to the memory circuitry that is connected to the communication channel 108. The memory controllers 120 and 122 also execute self-refresh and clock enable operations for the main memory 104 based on power control unit policies. The DMA circuitry 124 executes the channel consolidation operations. The DMA circuitry 124 receives indications of free and occupied memory segments, and receives commands from the power control circuitry 126 (e.g., a power control unit) to consolidate or de-consolidate memory segments. In response to commands from the power control circuitry 126 to consolidate or de-consolidate, the DMA circuitry 124 performs the channel consolidation by copying memory from occupied segments in a "source" channel to free segments in a "target" channel, to enable the source channel to be turned off. The DMA circuitry 124 performs the reverse operation during de-consolidation. The power control circuitry 126 and/or the DMA circuitry 124 causes the main memory 104 to perform operations that dynamically (e.g., while the computing system 100 is operating) transform the main memory 104 from dual-channel (or multi-channel, e.g., 8 channels in LPDDR4 and LPDDR5) operation to single-channel operation (or half the channels, e.g., 4 channels in LPDDR4 and LPDDR5), to decrease power consumption by the main memory 104, by the memory controller circuitry 122, and by the computing system 100, according to one embodiment.

The main memory 104 is coupled to the system host 102 through the communication channel 106 and the communication channel 108. Although two communication channels are illustrated and described many more communication channels may be employed (e.g., 4, 6, etc.) to facilitate information transfer between the system host 102 and the main memory 104. The main memory 104 includes first memory circuitry 128, second memory circuitry 130, third memory circuitry 132, and fourth memory circuitry 134, according to one embodiment. The main memory 104 may include more or fewer memory circuitry, according to various implementations. The first memory circuitry 128 is a first dual in-line memory module (DIMM), the second memory circuitry 130 is a second DIMM, the third memory circuitry 132 is a third DIMM, and the fourth memory circuitry 134 is a fourth DIMM, according to one embodiment. Each of the first memory circuitry 128, the second memory circuitry 130, the third memory circuitry 132, and the fourth memory circuitry 134 include a number of random access memory (RAM) dice disposed on a first side of the DIMM (i.e., rank 1) and a number of RAM dice disposed on a second side of the DIMM (i.e., rank 2), in one embodiment. A RAM die may be referred to herein as a memory package or a memory die package. An example of a memory die package is a ball grid array (BGA) memory die package. A plurality of memory packages may at least partially constitute a DIMM. Although DIMMs are described and illustrated herein, SIMMs and/or RIMMs may also be used in the disclosed computing system. The communication channel 106 may be connected to the first memory circuitry 128 and the third memory circuitry 132. The communication channel 108 may be connected to the second memory circuitry 130 and the fourth memory circuitry 134.

FIGS. 1A and 1B illustrate simplified block diagrams of a multi-step process for dynamically transforming the main memory 104 from a multi-channel configuration to a single-channel configuration, while the computing system 100 continues to operate, to reduce the power consumption of the main memory 104, consistent with embodiments of the disclosure. Initially, the DMA circuitry 124 and/or the power control circuitry 126 receives one or more commands from the processor 110 to dynamically consolidate memory operations to a reduced number of segments or portions of the main memory 104. The DMA circuitry 124 and/or the power control circuitry 126 may receive one or more commands by reading configuration bits from a register 127, which may be updated/changed by the processor 110 (e.g., by an operating system). When the memory controller circuitry 120, 122 write cache lines to the main memory 104, the memory controller circuitry 120, 122 do so by distributing traffic across both channels at fine granularity such that a physical page is distributed across all channels to maximize bandwidth. Physical pages may be logically organized as segments (or portions) of the total available memory, and are distributed across multiple channels, DIMMs, and/or ranks. In one embodiment, each segment represents $\frac{1}{8}^{th}$ of the physical pages of the main memory 104. A single physical page of memory represents 4 kilobytes, in one embodiment. A single physical page of memory may represent a single row of one bank of each RAM die of all of the dice of the main memory 104.

The DMA circuitry 124 and/or the power control circuitry 126 controls the memory controller circuitry 120 and the memory controller circuitry 122 to consolidate the segments of memory into a reduced number of segments and then into a reduced number of channels. Reducing the number of segments is performed by an operating system (OS) paging out pages of memory. Reducing the number of channels (e.g., from 2 to 1) is performed by the power control circuitry 126, the DMA circuitry 124, and the memory controllers 120, 122. The memory controller 122, the second memory circuitry 130, and the fourth memory circuitry 134 may then be powered off.

In one embodiment, the OS identifies least recently used (LRU) pages of memory in the main memory 104. The LRU pages of memory include pages of memory (e.g., pages of data) that are not needed for BIOS operation, OS operation, and on-going computations. In one embodiment, the OS transfers (e.g., pages out) the LRU pages of memory to persistent storage device 140, via bus 142. After transferring the LRU pages of memory to one or more files on the persistent storage device 140, the OS defragments the main memory 104 and consolidates the remaining pages of memory into a group of consecutive pages of memory. A group of consecutive pages of memory may be referred to as a segment and the main memory 104 may be logically separated into 8 or more segments. The OS may cause data in segments 136 (e.g., representing segments 5-8) to be moved to the memory segments 138 (e.g., representing segments 1-4), in preparation for subsequent operations. As a result, the memory circuitry connected to each communication channel 106 and 108 will have occupied pages of memory (e.g., represented by segments 1-4) and vacant pages of memory (e.g., represented by segments 5-8). In other words, channel 0 will have channel 0 data (ch 0 data) that is consolidated from segments 1-8 on channel 0 down to segments 1-4 on channel 0. Additionally, channel 1 will have channel 1 data (ch 1 data) that is consolidated from segments 1-8 on channel 1 down to segments 1-4 on channel 1.

Turning to FIG. 1B, in a second operation of the process to dynamically transform the main memory 104 from a multi-channel configuration to a single-channel configuration, the DMA circuitry 124 and/or the power control circuitry 126 copies occupied segments of memory (represented by ch 1 data from segments 1-4 of channel 1) of one channel (e.g., of memory circuitry 130 and 134) to vacant segments of memory (represented by segments 5-8 of channel 0) on another channel (e.g., to memory circuitry 128 and 132). The data (ch 1 data) that was stored in the memory segments 138 on the communication channel 108 is moved to the segments 136 on the communication channel 106 (e.g., to the first memory circuitry 128), and/or to a first rank of memory dice for the first memory circuitry 128, according to one embodiment. Concurrently, the data (ch 0 data) that is stored in the memory segments 138 on the communication channel 106 is maintained on the first memory circuitry 128 (and/or on the third memory circuitry 132), according to one embodiment. Consolidating the main memory 104 in such a manner, enables the power control circuitry 126, and/or one or more components of the system host 102 to power down one or more of the memory controller 122, the second memory circuitry 130, and the fourth memory circuitry 134. Powering down the memory controller 122, second memory circuitry 130, and/or the fourth memory circuitry 134 may include, ceasing to refresh the memory dice, disabling the transmission of clock signals, disabling power, at least partially removing power from the memory controller circuitry 122, and/or powering down additional circuitry that supports the operation of channel 1, according to various embodiments.

Summarized in other terms, the OS moves pages in physical address space, and a memory segment is memory region that contains several pages (e.g. 1 GB memory=256 million 4K pages). One type of memory segment is a DRAM segment, which is a memory region in DRAM space that contains portions of pages (e.g., in the example above, where pages are split into two channels, each DRAM segment will be 0.5 GB of memory that contains 256 million half-pages). The OS moves pages to consolidate them into approximately 4 segments or half the memory space. The disclosed techniques (e.g., using the DMA circuitry 124, the power control circuitry 126, and the memory controller circuitry 122) employ hardware components to copy occupied segments from one channel to vacated segments of another channel to enable powering down at least one channel.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Figure 2:
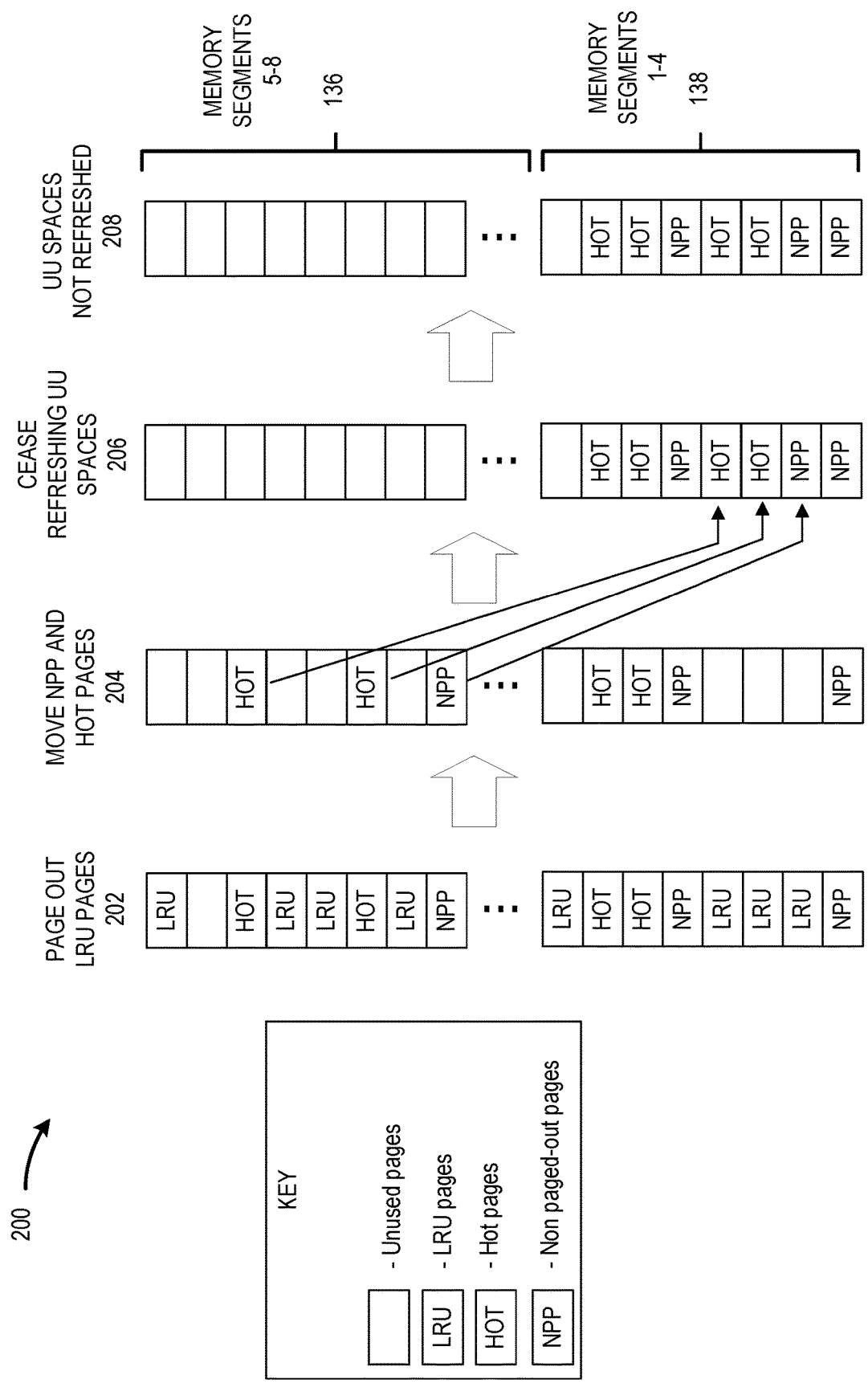
FIG. 2 is a flowchart of dynamically consolidating memory pages of memory segments of the main memory according to at least one embodiment of the present disclosure.

FIG. 2 illustrates a memory diagram of a process 200 for dynamically consolidating memory pages of memory segments of the main memory 104 (shown in FIGS. 1A and 1B) consistent with embodiments of the disclosure. The process includes several operations that free up portions (e.g., segments) of the main memory 104, in preparation for transforming the main memory 104 from a dual-channel or multi-channel configuration to a single-channel or half the channels configuration.

At operation 202, the process 200 includes paging out least recently used (LRU) pages, according to one embodiment. Paging out LRU pages can include transferring the data from the LRU pages to one or more files on a persistent storage device.

At operation 204, the process 200 includes moving non-pageable pages (NPP) and hot pages (e.g., actively used pages), according to one embodiment. Non-pageable pages may include pages of memory that store data for a basic input output system (BIOS) and/or data for the OS and for driver firmware/software. Hot pages may include pages that include data for applications that are presently executed or run by the processor or by the OS.

At operation 206, the process 200 includes ceasing refreshing unused pages, according to one embodiment. Ceasing refreshing may include disabling self-refresh modes for memory circuitry. Ceasing refreshing unused pages reduces power consumed by the main memory 104.

At operation 208, the unused pages are not refreshed, to reduce power consumption. As illustrated, at operation 208 the memory segments 138 (e.g., memory segments 1-4) includes occupied memory pages and the memory segments 136 (e.g., memory segments 5-8) include vacant memory pages. It is to be noted that the memory segments 136 and 138 include interleaved pages of memory from both the communication channel 106 and the communication channel 108.

Figure 3:
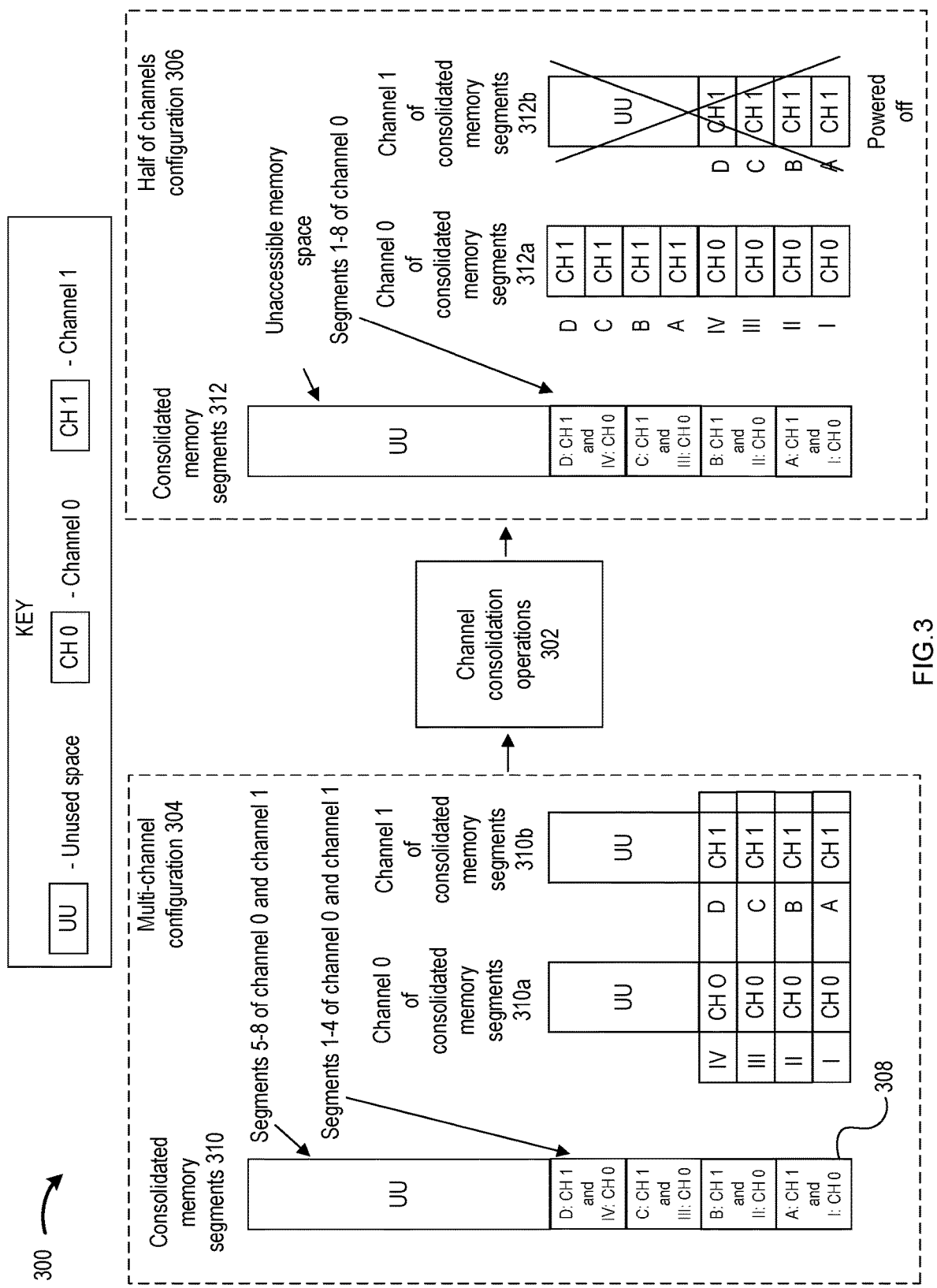
FIG. 3 is a flowchart of transforming main memory from a dual-channel or multi-channel configuration to a single-channel configuration according to various embodiments of the present disclosure.

FIG. 3 is a memory diagram of a process 300 for transforming the main memory 104 (shown in FIGS. 1A and 1B) from a dual-channel or multi-channel configuration to a single-channel or half of channels configuration, consistent with embodiments of the disclosure. The process 300 performs channel consolidation operations 302 to transform portions of main memory 104 from a multi-channel configuration 304 to a half of channels configuration 306, according to one embodiment. Each of the portions 308 of the consolidated memory segments 310 represent a segment in the consolidated memory space of the channels 310a and 310b. Because the portions 308 of the consolidated memory segments 310 are split across channels at granularity that is smaller than an OS page in memory, an operating system ("OS") may be incapable of transferring data between channels (e.g., from channel 1 to channel 0). For example, an SOC (e.g., the system host 102) is typically configured to transfer 64 cache lines (4,096 bytes) at a time when writing or reading a virtual or physical page (e.g., a 4 kilobyte page).

In the multi-channel configuration 304, channel 0 of the consolidated memory segments 310a includes unused or vacant memory pages UU (e.g., segments 5-8) and occupied memory pages (e.g., segments 1-4), with CH 0 representing data that is stored on channel 0. Channel 1 of the consolidated memory segments 310b includes unused memory UU (e.g., segments 5-8) and occupied memory pages (e.g., segments 1-4), with data CH 1 representing data that is stored on channel 1. In the consolidated memory segments 310, the data CH 0 and the data CH 1 are interleaved between a first channel and a second channel, according to one embodiment. In one embodiment, data may be interleaved between more than 2 channels.

After channel consolidation operations 302, the main memory 104 is transformed to the single-channel configuration 306, according to one embodiment. Post-transformation, consolidated memory segments 312 include occupied memory pages (e.g., segments 1-4 of channel 0) all on channel 0, in one embodiment. Additionally, post-transformation, channel 0 of the consolidated memory segments 312a at least partially fills its unused memory UU (e.g., segments 5-8) with the data CH 1 that was previously stored on channel 1 as the channel 1 of consolidated memory segments 312b. By consolidating data from two or more channels to a single channel, a computing system receives the ability to power down a channel (e.g., channel 1), a memory controller for a channel, and memory circuitry (e.g., a DIMM) supported by a channel.

Notably, after the transformation to the single-channel configuration, the OS and applications continue to operate as though the main memory were in the multi-channel configuration by writing to virtual pages, which are translated by the power control circuitry and/or the system agent circuitry to physical pages in a single channel. A notable difference from this point is that the OS cannot use the UU segments until reverting to the multi-channel state since this UU space, maps to unused space in 310a and 310b is now taken by CH1 segments on channel 0 in 312a and inaccessible segments in 312b that is powered off. The OS does not allocate pages in these UU segments and system agent 118 (shown in FIG. 1A) blocks such illegal transactions.

Figure 5:
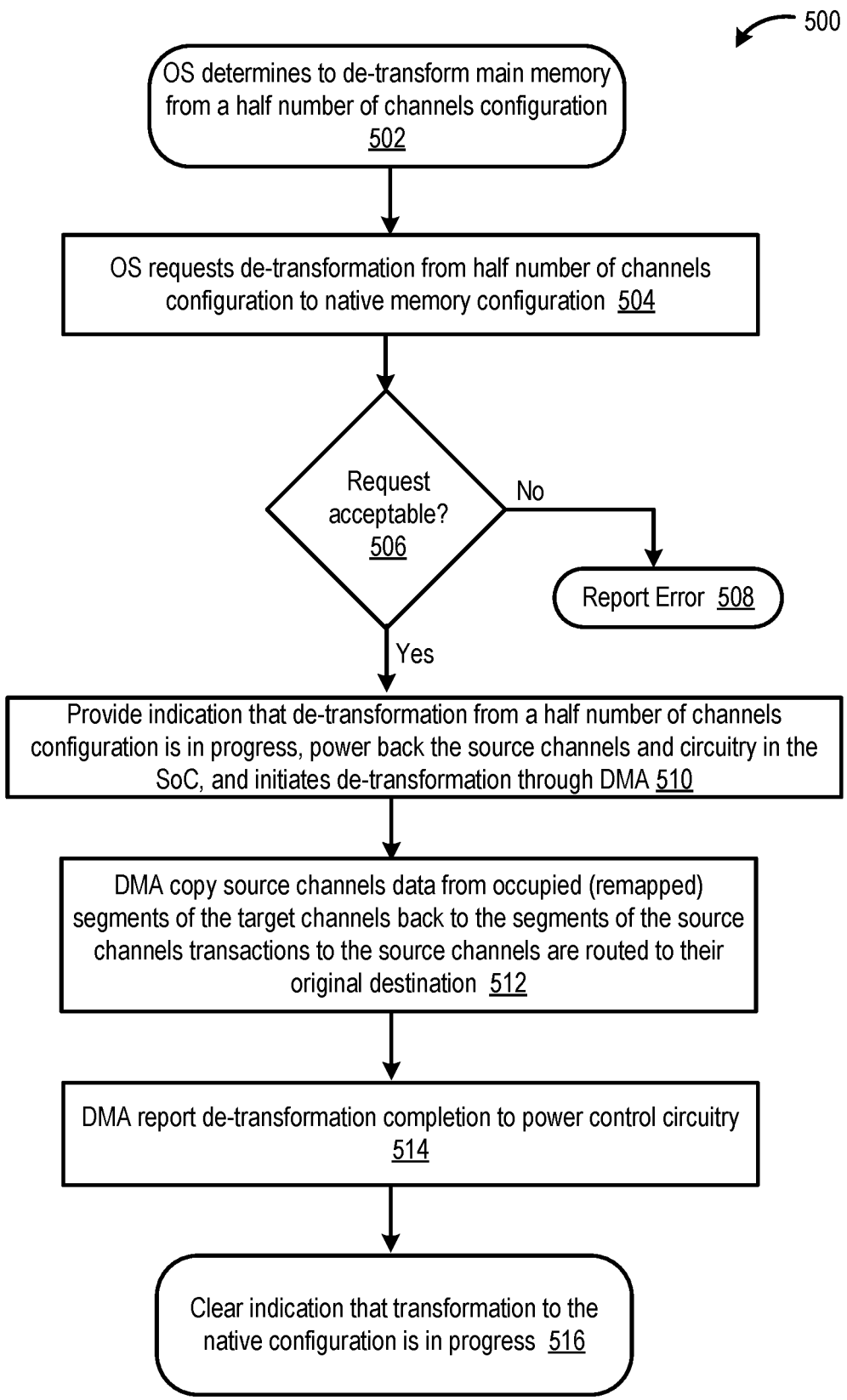
FIG. 5 is a flowchart of dynamically de-transforming main memory from a single-channel configuration to a native (dual-channel or multi-channel) configuration according to various embodiments of the present disclosure.

The channel consolidation operations 302 are described in the process 400 of FIG. 4 and in the process 500 of FIG. 5, consistent with embodiments of the present disclosure.

The channel consolidation operations 302 include, but are not limited to, identify unused space in a first channel, map portions of the second channel to the first channel, copy data from the second channel to unused space in the first channel, use the first channel to respond to operations (e.g., read and write) that are directed towards the first channel and the second channel to enable the operation system and software applications to use virtual memory mappings as though the second channel or as though multiple channels were active, and power down the second channel (e.g., channel 1).

Because the configuration transformation is dynamic (e.g., occurs while the computing system 100 of FIGS. 1A and 1B is running), the power control circuitry can be configured to handle the transformation to the single-channel configuration while continuing to receive read and write requests. If a new read or write request is received during the actual copying of a portion 308 from the second channel (channel 1) to a first channel (e.g., channel 0), the power control circuitry may be configured to use the old or previous memory address to fulfill the read or write request. After a memory portion has been copied over to the first channel, the power control circuitry may be configured to direct the read or write request to the new address (e.g., of channel 0). The transformation may begin at higher addresses and continue to lower addresses to enable a simple comparator to be used to determine if a transformation has already taken place and to determine whether to send a read or write request to an old address or a new address. In one embodiment, the OS may stop the transformation mid-transformation. To reverse the transformation, the OS may change configuration bits in a register for the power control circuitry, which causes the power control circuitry to reapply power to the powered down channel and restore channel 1 data to channel 1 from channel 0, in one embodiment.

FIG. 4 is a flowchart of a process 400 for dynamically transforming main memory from a dual-channel or multi-channel configuration to a single-channel or half of channels configuration, according to various embodiments of the present disclosure.

At operation 402, an operating system (OS) initiates operations to transform main memory to half of memory channels configuration, the OS pages out LRU pages such that half or less of memory is occupied, and consolidates pages into half or less of the number of segments, according to one embodiment. As an example, the OS may determine to transform main memory to a single channel configuration when the OS is performing low bandwidth operations (e.g., video playback, running word processing applications, etc.).

At operation 404, the OS requests initiation of the transformation to half of memory channels configuration, according to one embodiment. The OS may request initiation of the configuration by transmitting one or more requests in program code, according to one embodiment. The OS may request initiation of the half memory channel configuration by changing one or more bits of a register for power control circuitry that is configured to manage the transformation from multi-channel configuration to half of memory channels configuration of main memory.

At operation 406, the power control circuitry and/or the system agent circuitry determines whether the request from the OS is acceptable, according to one embodiment. If the request is unacceptable, operation 406 proceeds to operation 408 where an error is reported, according to one embodiment. If the request is acceptable, operation 406 proceeds to operation 410, according to one embodiment.

At operation 410, the power control circuitry provides indication that transformation to the half of memory channels configuration is in progress, and the power control circuitry initiates the transformation through direct memory access (DMA) circuitry, according to one embodiment. The transformation has initiated through the DMA by providing the DMA with a command to initiate the transformation and by providing the DMA with source (e.g. occupied segments in channel 1) and destination (e.g. vacant segments in channel 0) addresses for the data transfer.

At operation 412, the DMA copies data from occupied segments of the source channels (source addresses) to vacant segments of target channels (destination addresses) and transactions to the source channels are routed to the remapped segments of target channels, according to one embodiment. In one embodiment, the DMA updates a status register with an address of the source address that was most recently read. In one embodiment, the DMA updates a status register with an address of the destination address that was most recently written to. In one embodiment, the DMA or router logic determines whether read or write access requests should be directed to an old (source) memory address or to a new (target) memory address based on whether the data has already been transferred from the old address.

At operation 414, the DMA reports completion of the transformation to the power control circuitry, according to one embodiment.

At operation 416, the power control circuitry clears an indication that the transformation to the half of channels configuration is in progress, and the power control circuitry powers down the source channels, according to one embodiment. Powering down the source channels may include disabling power to memory controller circuitry for the source channels, disabling clocks to memory circuitry for the source channels, disabling power to drivers and/or other physical layer components that support operation of the source channels, according to one embodiment.

In one embodiment, instead of a transformation to half number of channels or a single-channel configuration, the computing system may be configured to transform the main memory to a single rank configuration (e.g., move data and operations to rank 1 or rank 2 of a DIMM).

In one embodiment, the DMA writes each OS pages (e.g., 4 kilobytes of data) to a single DRAM page (e.g., a single row in the same bank for all of the memory dice on channel 0), when may improve power reduction of the single-channel configuration.

FIG. 5 is a flowchart of a process 500 for dynamically de-transforming main memory from a half number of channels configuration to a native (dual-channel or multi-channel) configuration, according to various embodiments of the present disclosure.

At operation 502, an operating system (OS) determines to de-transform main memory from a half number of channels configuration, according to one embodiment.

At operation 504, the OS requests initiation of the de-transformation from half number of channels configuration to a native memory configuration, according to one embodiment. The OS may request initiation of de-transformation from the half number of channels configuration by transmitting one or more request in program code, according to one embodiment. The OS may request initiation of de-transformation from the half number of channels configuration by changing one or more bits of a register for power control circuitry that is configured to manage the transformation from multi-channel configuration to half number of channels configuration of main memory and vice-versa.

At operation 506, the power control circuitry and/or the system agent circuitry determines whether the request from the OS is acceptable, according to one embodiment. If the request is unacceptable, operation 506 proceeds to operation 508 where an error is reported, according to one embodiment. If the request is acceptable, operation 506 proceeds to operation 510, according to one embodiment.

At operation 510, the power control circuitry provides indication that de-transformation from half number of channels configuration is in progress, and the power control circuitry powers back the memory channels and circuitry in SoC and initiates the de-transformation through direct memory access (DMA) circuitry, according to one embodiment. The transformation has initiated through the DMA by providing the DMA with a command to initiate the de-transformation and by providing the DMA with source and destination addresses for the data transfer.

At operation 512, the DMA copies source channels data from occupied (remapped) segments of the target channels back to the segments of the source channel, and transactions to the source channels are routed to their original destination, according to one embodiment. In one embodiment, the DMA updates a status register with an address of the source address that was most recently read. In one embodiment, the DMA updates a status register with an address of the destination address that was most recently written to. In one embodiment, the DMA or router logic determines whether additional read or write access requests should be directed to an old memory address (e.g., channel 0) or to a new memory address (e.g., channel 1) based on whether the data has already been transferred from the old address.

At operation 514, the DMA reports completion of the de-transformation to the power control circuitry, according to one embodiment.

At operation 516, the power control circuitry clears an indication that the transformation to the native configuration is in progress, and supporting circuitry and components for supporting the second channel operations have been powered up.

An example of the register and bits of the register 127 (shown in FIG. 1) are included in Table 1 below. As used herein "Pcode" may refer to the power control circuitry or to program code that is an intermediary compiled language that is between machine code an OS code.

TABLE 1

| Field | Size | Access Type | Comment |
|---|---|---|---|
| Free/Occupied segments | 8b | RW | OS to Pcode, bit indication per memory segment: '1 = free, '0 = occupied |
| Transformer request | 3b | RW | OS to Pcode, request for a state transition. '000: De-transform to native system configuration '001: Transform to 64b memory '010: Transform to 32b memory '011: Transform to 1 rank memory Other variants e.g. from 4 ranks to 2 ranks may apply |
| Transformation/De-transformation in progress | 1b | RO | Pcode to OS indicating state change in progress |
| Transformer status | 3b | RO | Pcode to OS, status using same coding as request. This is valid only when the in-progress bit is cleared |
| Error | 1b | RW | Pcode to OS indicating unable to perform the request. OS must resolve the error (e.g. free more segments), clear the error bit, and set new request |

In one embodiment, the register is 16 bits long. 8 bits of the register may indicate which segments or portions of memory are vacant or occupied. 3 bits of the register may indicate the type of transformation to perform (e.g., 64 bit single-channel, 32 bit single-channel, a single rank transformation, or revert to native configuration). 1 bit may be used to indicate whether transformation or de-transformation is in progress. 3 bits may be used to indicate which type of transformation is taking place and may be transmitted to the OS. 1 bit may be used to indicate whether an error exists, making the transformation not executable.

While the diagrams of FIGS. 1A, 1B, 2, 3, 4, and 5 illustrate operations according various embodiments, it is to be understood that not all of the operations depicted in FIGS. 1A, 1B, 2, 3, 4, and 5 are necessary for other embodiments. In addition, it is fully contemplated herein that in other embodiments of the present disclosure, the operations depicted in FIGS. 1A, 1B, 2, 3, 4, and 5 and/or other operations described herein may be combined in a manner not specifically shown in any of the drawings, and such embodiments may include less or more operations than are illustrated in FIGS. 1A, 1B, 2, 3, 4, and 5. Thus, claims directed to features and/or operations that are not exactly shown in one drawing are deemed within the scope and content of the present disclosure. The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

The instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6B:
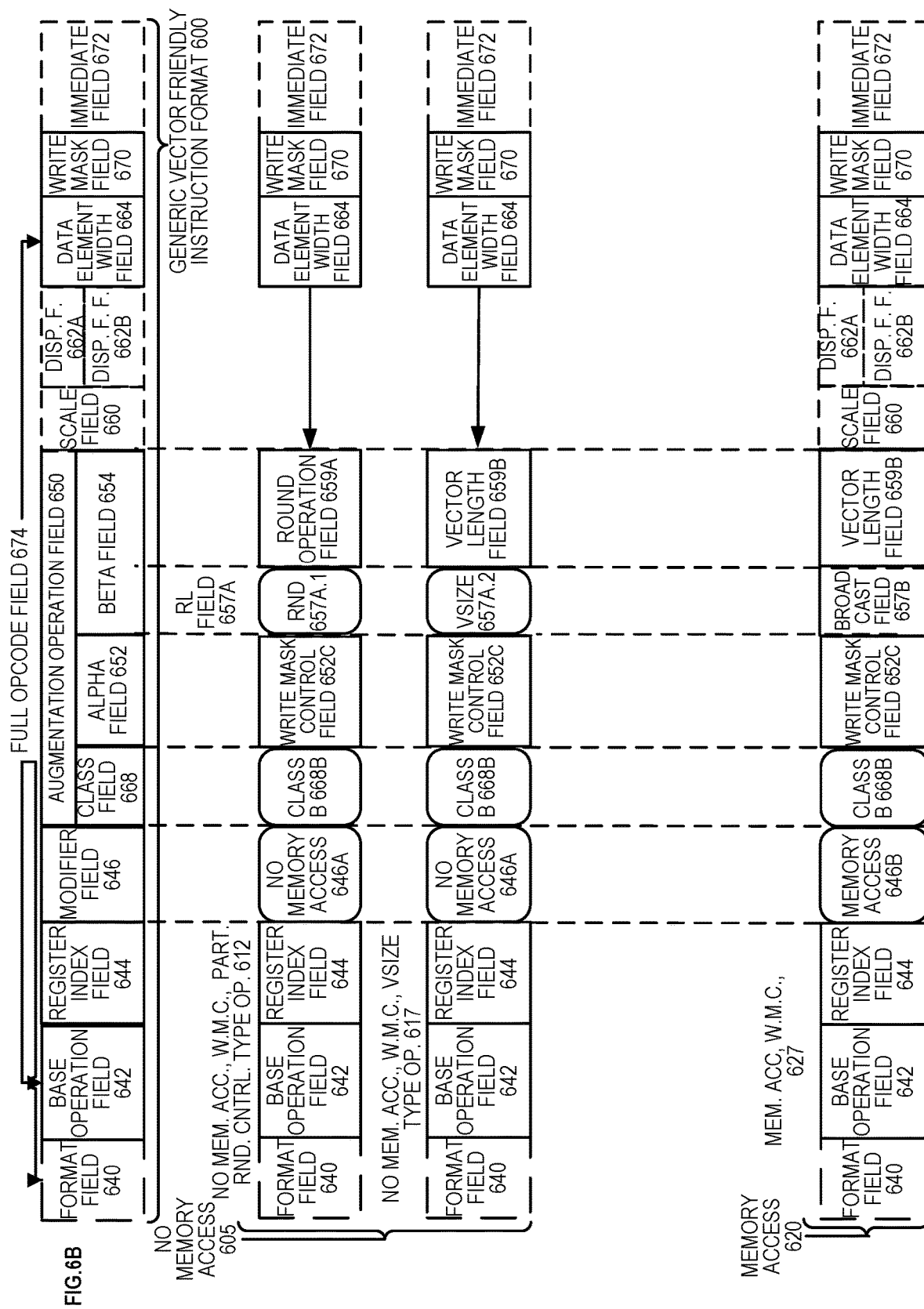

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*\text{index}+\text{base}$).

Displacement Field 662A—its content is used as part of memory address generation (e.g., for address generation that uses $2^{scale}*\text{index}+\text{base}+\text{displacement}$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale field 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale field 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.0 668 Class field (EVEX byte 2, bit [2]—U)—If EVEX.0=0, it indicates class A or EVEX.U0; if EVEX.0=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
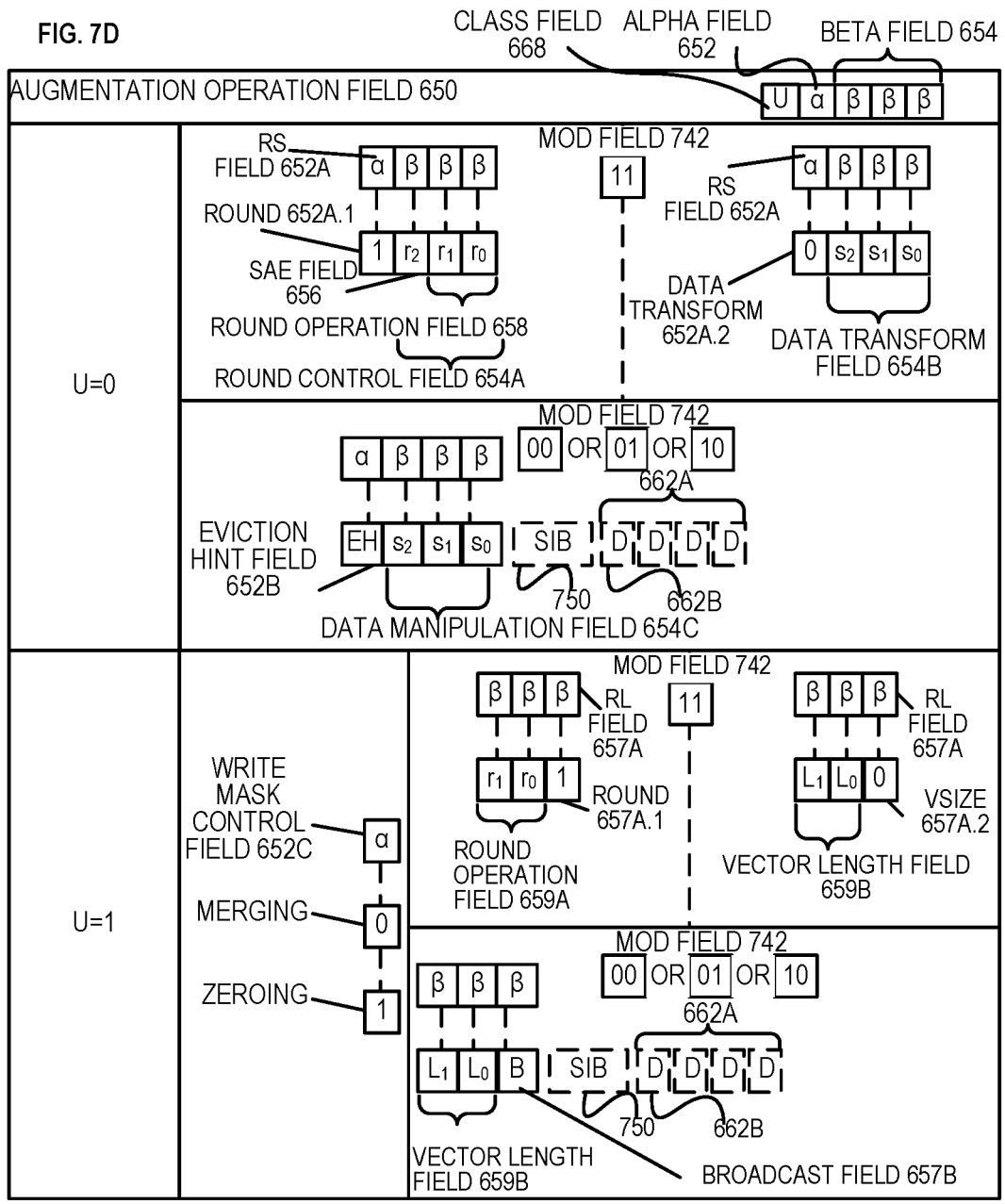

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
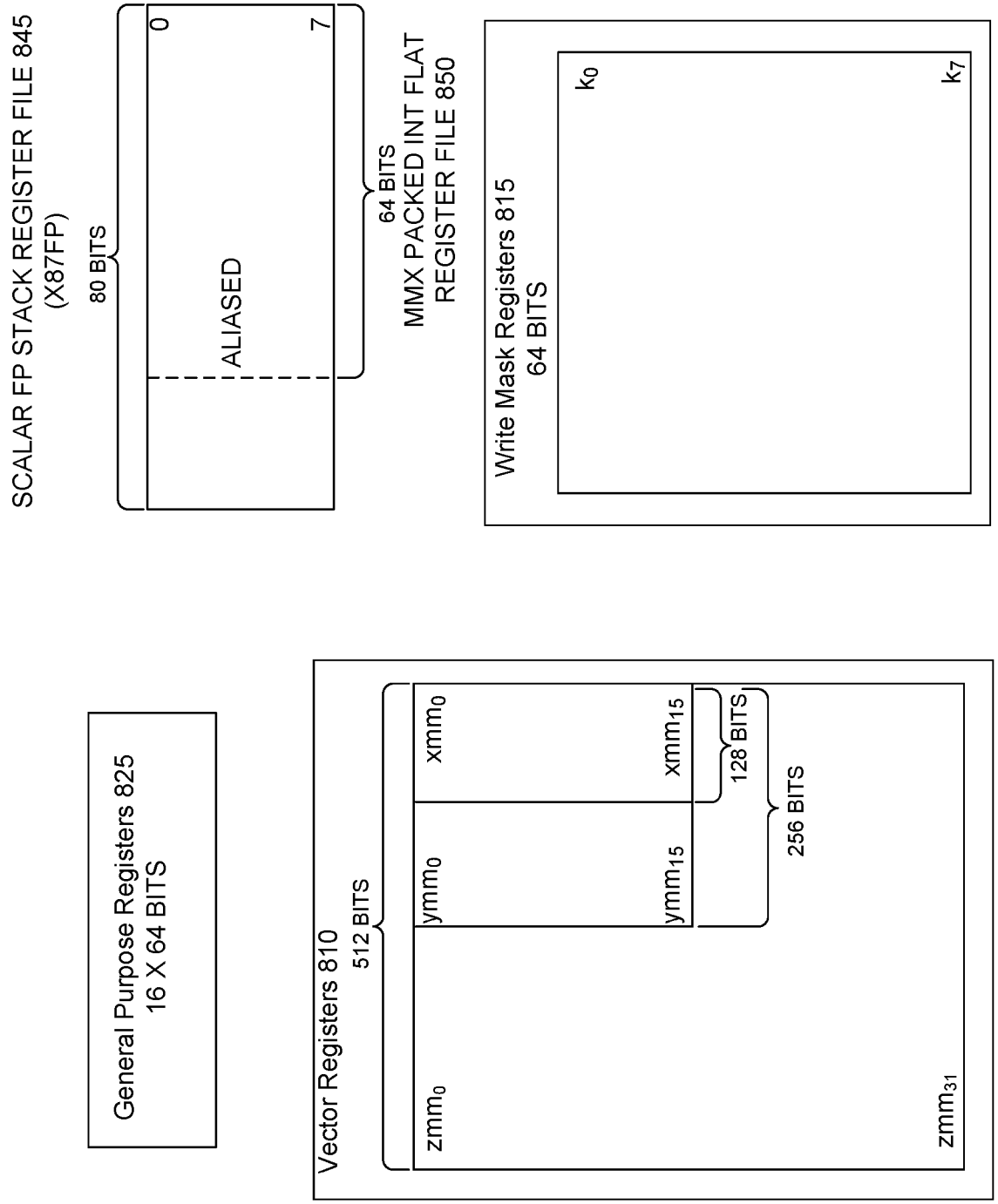
FIG. 8 is a block diagram of a register architecture according to one embodiment of the disclosure.

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
| --- | --- | --- | --- |
| Instruction Templates that do not include the vector length field 659B | A (FIG. 6A; U = 0) | 610, 615, 625, 630 | zmm registers (the vector length is 64 byte) |
|  | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
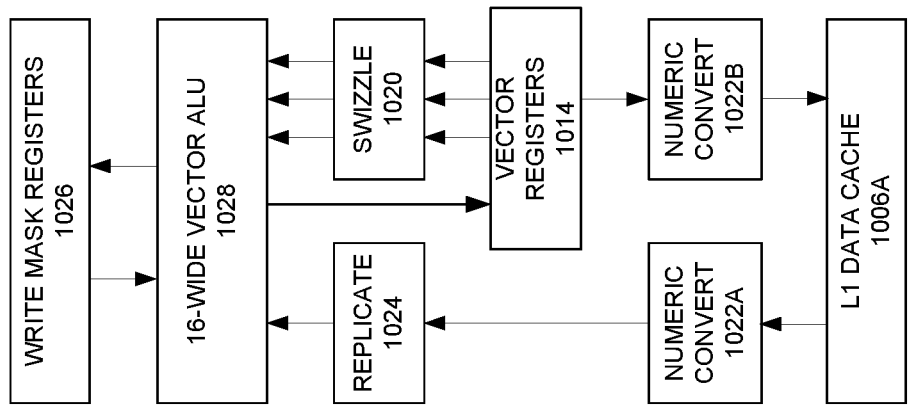
FIGS. 10A-B illustrate a block diagram of a more specific exemplary in-order core architecture, which core would be one of several logic blocks (including other cores of the same type and/or different types) in a chip.
Figure 10A:
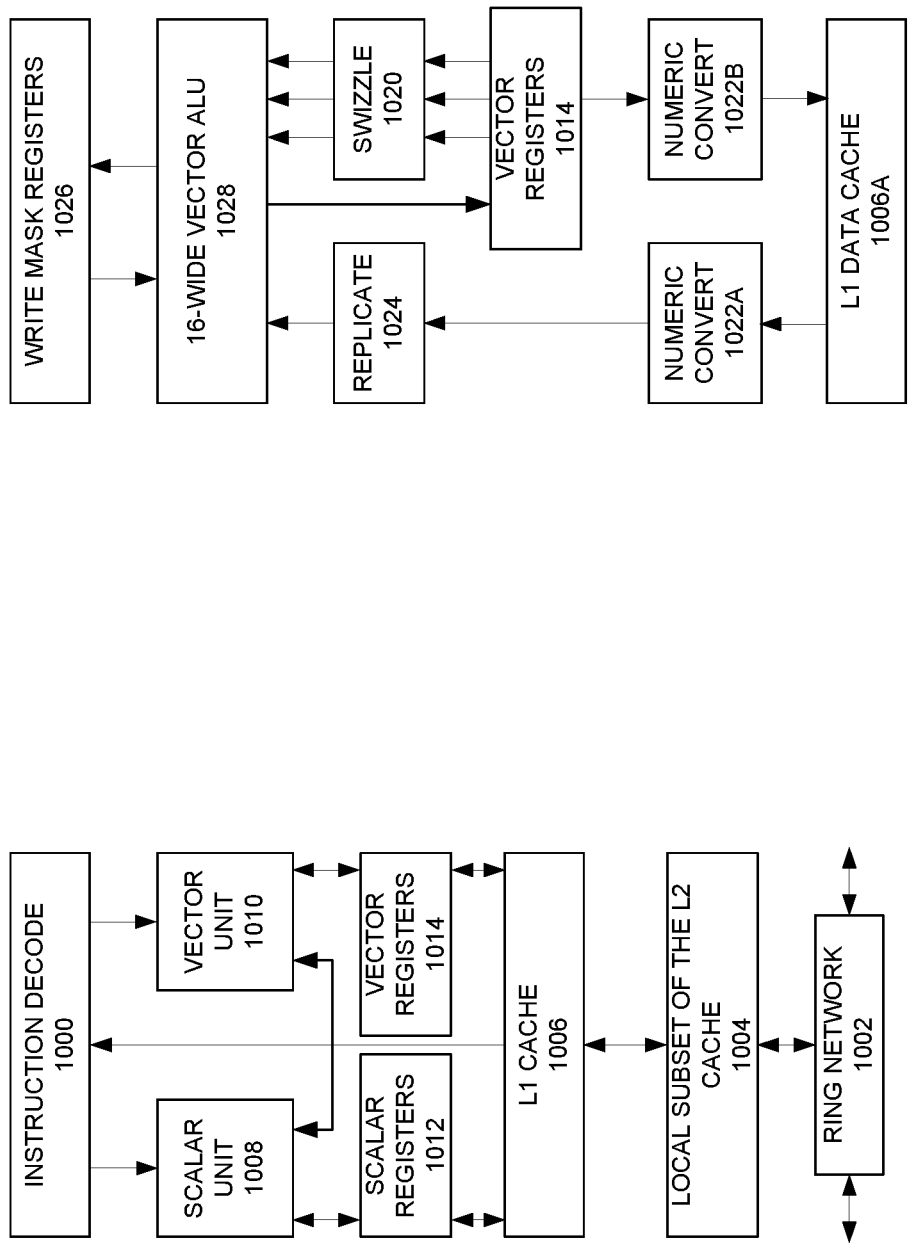

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
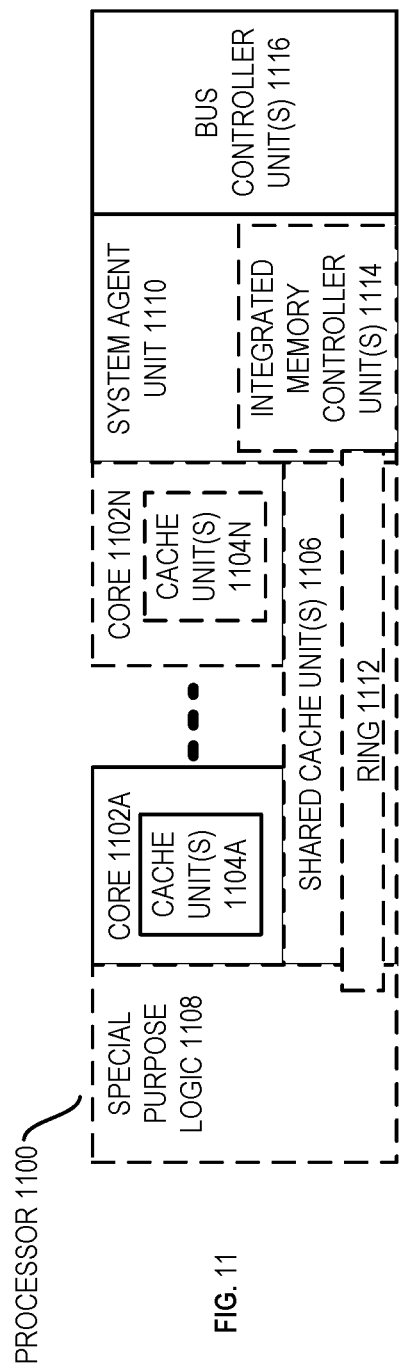
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
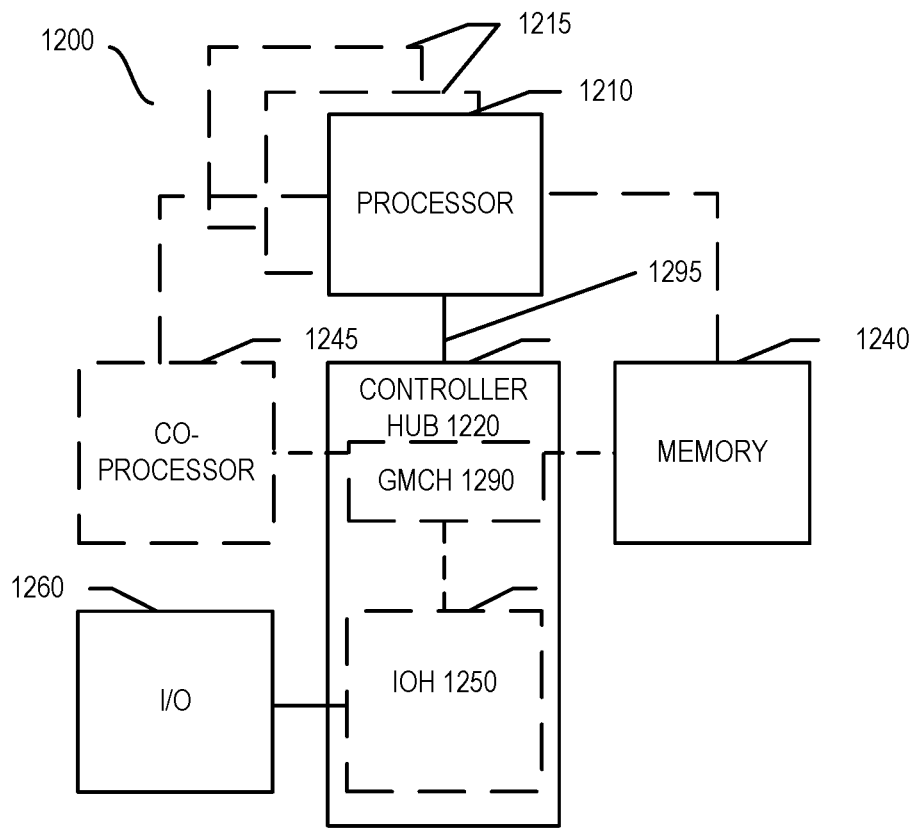
FIGS. 12-15 are block diagrams of exemplary computer architectures.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface/interconects such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
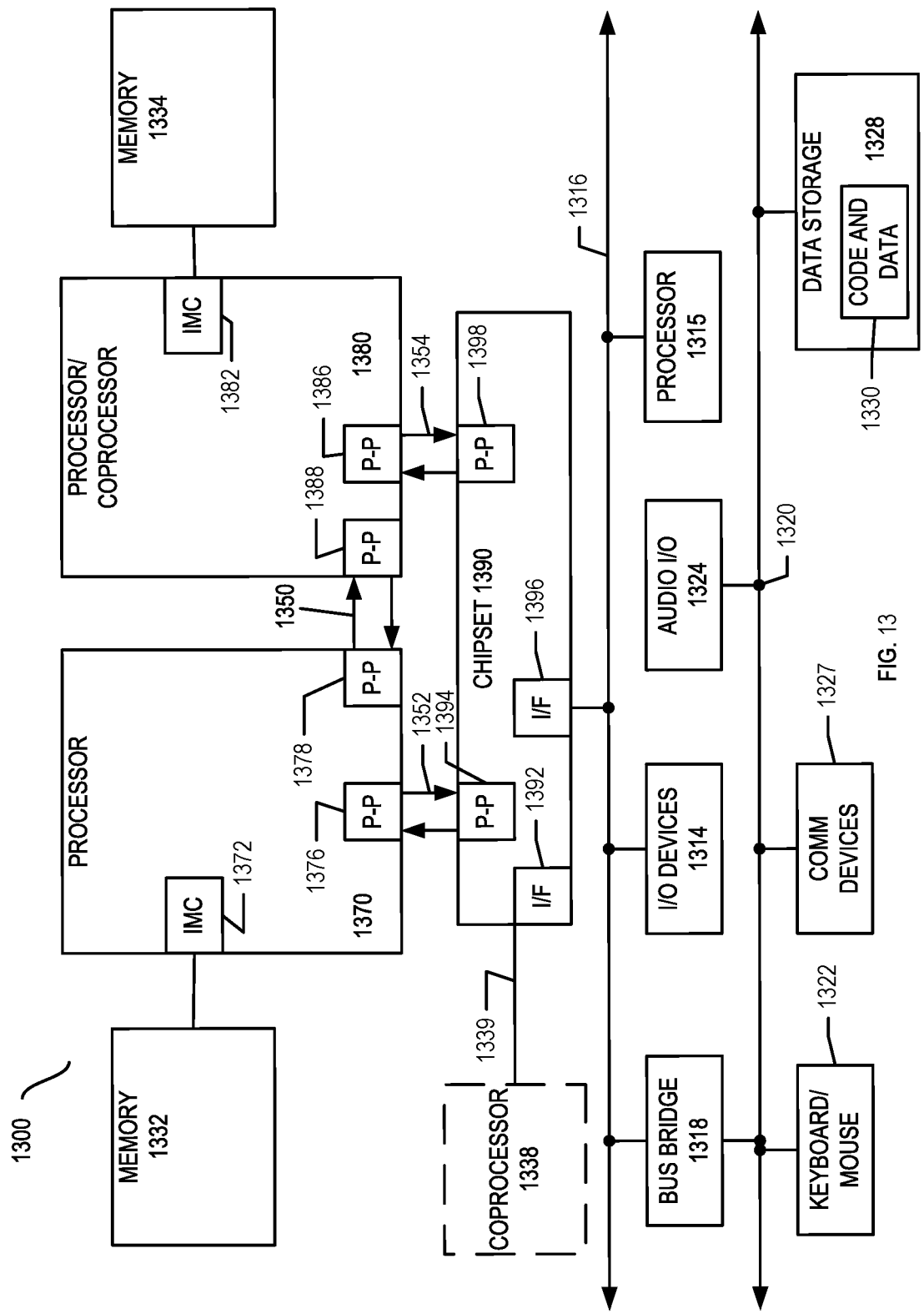

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus or a point-to-point interface, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
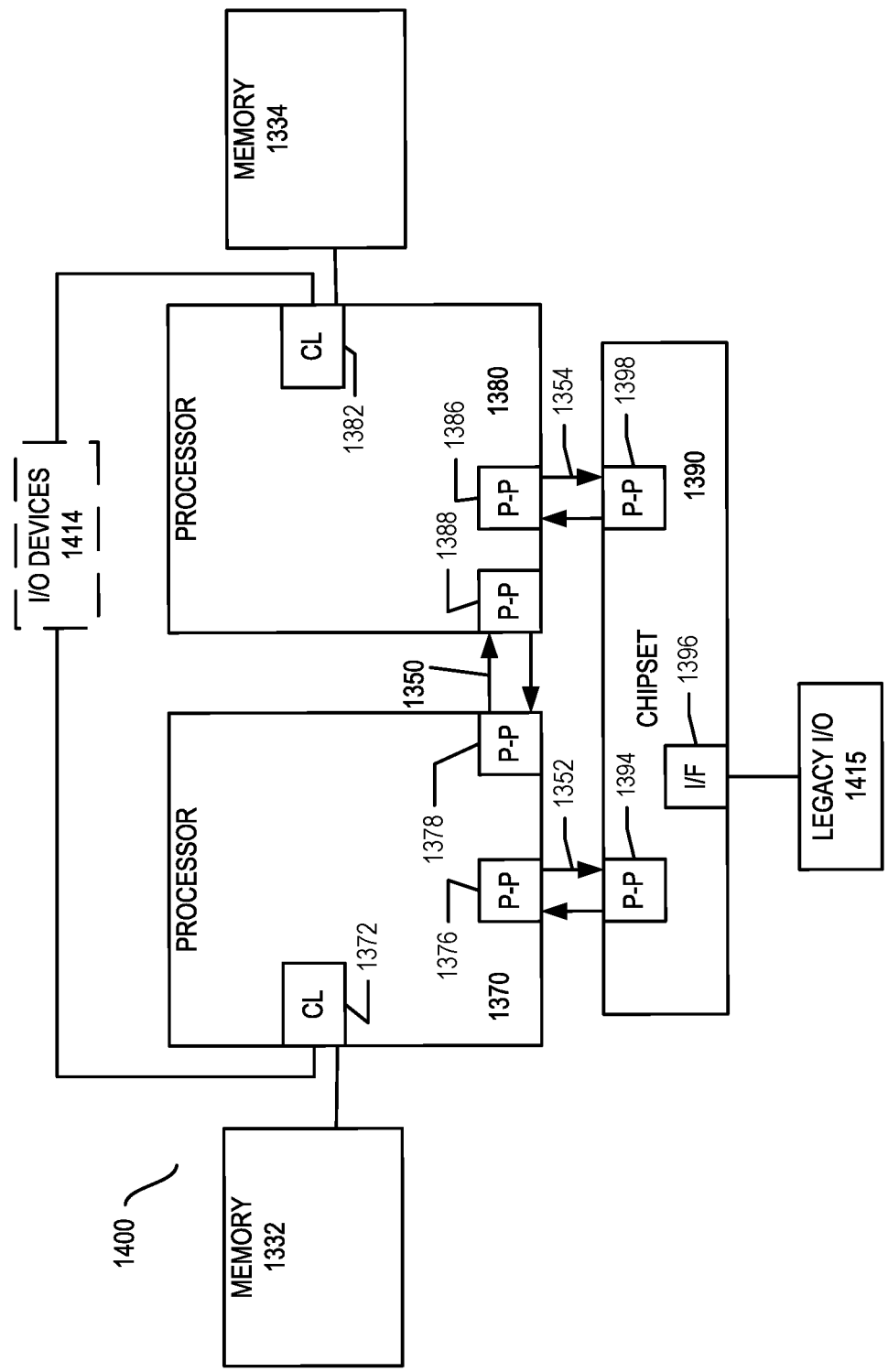

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
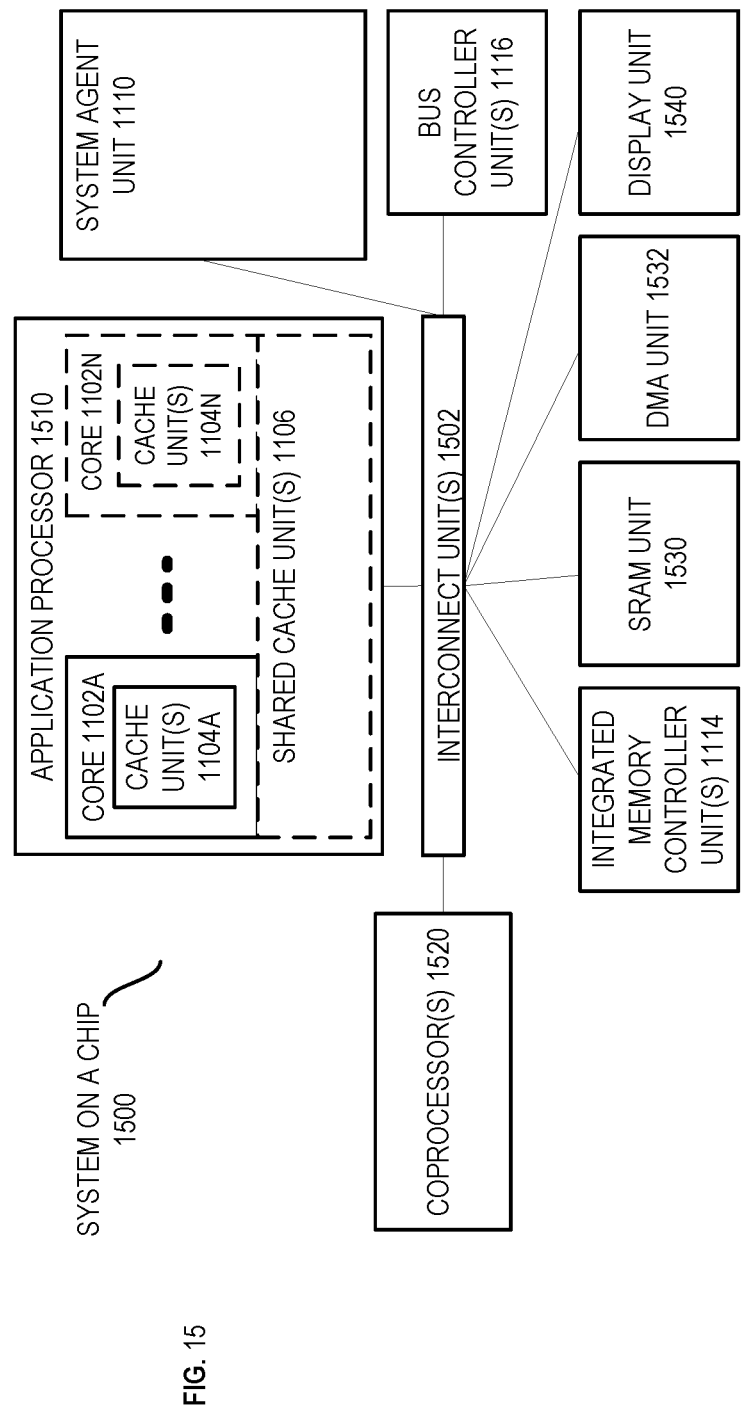

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 110 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, a device, an apparatus, or a system related to predictive detection of user intent for stylus use, as discussed below.

Example 1

According to this example, there is provided an apparatus. The apparatus includes first memory controller circuitry to control read and/or write access to first memory circuitry via a first conductive bus; second memory controller circuitry to control read and/or write access to second memory circuitry via a second conductive bus; and power control circuitry coupled to the first memory controller circuitry and the second memory controller circuitry, the power control circuitry to transfer data from the second memory circuitry with the second memory controller circuitry via the second conductive bus to the first memory circuitry with the first memory controller circuitry via the first conductive bus, and the power control circuitry to power down the second memory circuitry after the transfer of the data from the second memory circuitry to the first memory circuitry. As used herein, a conductive bus may include a multi-drop bus, such as a frontside bus (FSB); a point-to-point interface, such as QuickPath Interconnect (QPI); or similar connections.

Example 2

This example includes the elements of example 1, wherein the first memory controller circuitry includes a first plurality of memory controllers, wherein the first memory circuitry includes a first plurality of memory packages, wherein the first conductive bus includes a first plurality of channels to couple the first plurality of memory controllers to the first plurality of memory packages; wherein the second memory controller circuitry includes a second plurality of memory controllers, wherein the second memory circuitry includes a second plurality of memory packages, wherein the second conductive bus includes a second plurality of channels to couple the second plurality of memory controllers to the second plurality of memory packages.

Example 3

This example includes the elements of example 2, wherein the first plurality of memory controllers includes a first one or more memory controllers, wherein the first plurality of channels includes a first one or more channels, wherein the second plurality of memory controllers includes a second one or more memory controllers, wherein the second plurality of channels includes a second one or more channels, wherein the power control circuitry to power down the second memory circuitry by powering down the second one or more memory controllers and the second plurality of memory packages.

Example 4

This example includes the elements of example 1, further comprising a processor core to execute an operating system, wherein the operating system to transfer at least half of data of the first memory circuitry and of the second memory circuitry to one or more files in a persistent storage device, the operating system to move remaining pages of data of the first memory circuitry and of the second memory circuitry to a group of consecutive memory pages within the first memory circuitry and the second memory circuitry.

Example 5

This example includes the elements of example 4, wherein copy the remaining pages of data of the first memory circuitry and of the second memory circuitry to the group of consecutive memory pages within the first memory circuitry and the second memory circuitry results in vacant pages of memory within the first memory circuitry and occupied pages of memory within the second memory circuitry.

Example 6

This example includes the elements of example 5, wherein transfer the data from the second memory circuitry to the first memory circuitry, includes: transfer the data of the occupied pages of memory within the second memory circuitry to locations within the vacant pages of memory within the first memory circuitry.

Example 7

This example includes the elements of example 5, wherein transfer the data from the second memory circuitry to the first memory circuitry, includes: transfer dynamic random-access memory ("DRAM") pages of memory within the second memory circuitry to DRAM pages of memory within the first memory circuitry.

Example 8

This example includes the elements of example 1, wherein, while the second memory circuitry is powered down, the power control circuitry to route new traffic to locations within the first memory circuitry if the new traffic maps to locations within the second memory circuitry.

Example 9

This example includes the elements of example 1, wherein the power control circuitry to power up the second memory circuitry, in response to receipt of a command to power up the second memory circuitry, wherein the power control circuitry to return the transferred data from the first memory circuitry to the second memory circuitry.

Example 10

This example includes the elements of example 1, wherein power down the second memory circuitry includes one or more of: cease clock signal transmission to the second memory circuitry over the second conductive bus; remove power to the second memory circuitry; disable automated self-refresh operations for the second memory circuitry; or at least partially remove power to the second memory controller circuitry.

Example 11

This example includes the elements of example 1, wherein the power control circuitry to power down the second memory circuitry includes powering down at least half of a combination of the first memory circuitry and the second memory circuitry.

Example 12

This example includes the elements of example 1, wherein the power control circuitry transfers the data from the second memory circuitry to the first memory circuitry responsive to configuration bits of a power control register.

Example 13

This example includes the elements of example 11, wherein the power control register is accessible by an operating system executed by a processor.

Example 14

According to this example, there is provided a method. The method includes receiving, by power control circuitry, an instruction to transfer data to first memory circuitry via first channels from second memory circuitry via second channels; transferring at least half of data stored in the first memory circuitry and stored in the second memory circuitry to one or more files in persistent storage, wherein non-transferred data is remaining data; copying the remaining data to a group of consecutive pages among the first memory circuitry and among the second memory circuitry to provide occupied memory pages in the second memory circuitry and vacant memory pages in the first memory circuitry; transferring data from the occupied memory pages in the second memory circuitry to memory locations in the vacant memory pages in the first memory circuitry; and decreasing power applied to the second memory circuitry.

Example 15

This example includes the elements of example 14, wherein decreasing power applied to the second memory circuit includes one or more of: ceasing clock signal transmission to the second memory circuitry over the second channels; removing power to the second memory circuitry; disabling automated self-refresh operations for the second memory circuitry; or at least partially removing power to the second memory controller circuitry.

Example 16

This example includes the elements of example 14, further comprising: re-applying power to the second memory circuitry, in response to receipt of a command to power up the second memory circuitry; and copying, from the first memory circuitry to the second memory circuitry, the data that was transferred from the second memory circuitry to the first memory circuitry.

Example 17

This example includes the elements of example 14, wherein receiving, by power control circuitry, an instruction to transfer data to first memory circuitry via the first channels from second memory circuitry via the second channels, includes: reading bits from a power control register that stores configuration settings for the first memory circuitry and the second memory circuitry.

Example 18

According to this example, there is provided a system. The system includes a processor; at least one memory controller to control read and/or write access to a first plurality of memory packages via at least one first channel and to a second plurality of memory packages via at least one second channel; and power control circuitry coupled to the at least one memory controller, the power control circuitry to transfer data from the second plurality of memory packages to the first plurality of memory packages, the power control circuitry to power down at least half of the at least one first channel and the at least one second channel, and the power control circuitry to power down the second plurality of memory packages after the transfer of the data from the second plurality of memory packages to the first plurality of memory packages Example 19

This example includes the elements of example 18, further comprising: system agent circuitry to control power features of the processor, wherein the system agent circuitry includes the power control circuitry; and interconnect circuitry to couple the processor to the system agent circuitry and to the at least one memory controller.

Example 20

This example includes the elements of example 18, wherein the power control circuitry to transfer at least half of pages of data of the first plurality of memory packages and of the second plurality of memory packages to one or more files in a persistent storage device, the power control circuitry to copy remaining pages of data of the first plurality of memory packages and of the second plurality of memory packages to a group of consecutive memory pages within the first memory packages and the second memory packages.

Example 21

This example includes the elements of example 20, wherein the group of consecutive memory pages includes a plurality of segments of memory pages.

Example 22

This example includes the elements of example 20, wherein copy the remaining pages of data of the first plurality of memory packages and of the second plurality of memory packages to the group of consecutive memory pages within the first plurality of memory packages and the second plurality of memory packages results in vacant pages of memory within the first plurality of memory packages and occupied pages of memory within the second plurality of memory packages.

Example 23

This example includes the elements of example 22, wherein transfer the data from the second plurality of memory modules to the first plurality of memory modules, includes: transfer the data of the occupied pages of memory within the second plurality of memory packages to memory locations within the vacant pages of memory within the first plurality of memory packages.

Example 24

This example includes the elements of example 18, wherein, while the second plurality of memory packages is powered down, the power control circuitry to route new traffic to locations within the first plurality of memory packages if the new traffic maps to locations within the second plurality of memory packages.

Example 25

This example includes the elements of example 18, wherein the power control circuitry to power up the second plurality of memory packages, in response to receipt of a command to power up the second plurality of memory packages, wherein the power control circuitry to return the transferred data from the first plurality of memory packages to the second plurality of memory packages.

Example 26

According to this example, there is provided a computer readable device storing instructions that, if executed by one or more processors, performs the method of any one of examples 14 to 17.

Example 27

According to this example, there is provided a device comprising means to perform the method of any one of examples 14 to 17.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   first memory controller circuitry configured to control read and/or write access to first memory circuitry via a first conductive bus;
   second memory controller circuitry configured to control read and/or write access to second memory circuitry via a second conductive bus; and
   power control circuitry coupled to the first memory controller circuitry and the second memory controller circuitry, the power control circuitry configured to:
   cause the first memory controller circuitry to:
      transfer one or more least recently used (LRU) memory pages from the first memory circuitry to a persistent storage device; and
      consolidate a plurality of memory pages remaining in the first memory circuitry to sequential locations within the first memory circuitry to provide a plurality of first memory segments;
   cause the second memory controller circuitry to:
      transfer one or more least recently used (LRU) memory pages from the second memory circuitry to the persistent storage device; and
      consolidate a plurality of memory pages remaining in the second memory circuitry to sequential locations within the second memory circuitry to provide a plurality of second memory segments;
      transfer the plurality of second memory segments from the second memory circuitry to the first memory circuitry via the second conductive bus, the first memory controller circuitry, and the first conductive bus; and
   power down the second memory circuitry responsive to the second memory controller circuitry successfully completing the transfer of the second plurality of memory segments to the first memory circuitry.

2. The apparatus of claim 1, wherein the first memory circuitry includes a first plurality of memory packages, wherein the first conductive bus includes a first plurality of channels to couple the first memory controller circuitry to the first plurality of memory packages; and
   wherein the second conductive bus includes a second plurality of channels to couple the second memory controller circuitry to the second plurality of memory packages.

3. The apparatus of claim 2, wherein the power control circuitry is configured to power down the second memory circuitry by powering down the second plurality of memory controllers and the second plurality of memory packages.

4. The apparatus of claim 1, wherein to transfer the second plurality of memory segments from the second memory circuitry to the first memory circuitry, the power control circuitry is further configured to:
   transfer the second plurality of memory segments, each of the second plurality of memory segments including a plurality of dynamic random-access memory ("DRAM") pages of memory within the second memory circuitry to DRAM pages of memory within the first memory circuitry.

5. The apparatus of claim 1, wherein, while the second memory circuitry is powered down, the second memory controller circuitry is configured to route new traffic to locations within the first memory circuitry if new traffic maps to locations within the second memory circuitry.

6. The apparatus of claim 1, the power control circuitry is configured to further:
   receive a command to power up the second memory circuitry; and
   return transferred data from the first memory circuitry to the second memory circuitry responsive to receipt of the command to power up the second memory circuitry.

7. The apparatus of claim 1, wherein to power down the second memory circuitry the power control circuitry is further configured to perform one or more of:
   cease clock signal transmission to the second memory circuitry over the second conductive bus;

remove power to the second memory circuitry;
disable automated self-refresh operations for the second memory circuitry; or
at least partially remove power to the second memory controller circuitry.

8. The apparatus of claim 1, wherein to power down the second memory circuitry, the power control circuitry is further configured to:
power down the second memory controller circuitry.

9. The apparatus of claim 1, the power control circuitry to further:
read a power control register; and
cause the second memory controller circuitry to transfer the second plurality of memory segments from the second memory circuitry to the first memory circuitry responsive to a defined bit configuration stored in the power control register.

10. The apparatus of claim 9, wherein the power control register is accessible by an operating system executed by a processor.

11. A non-transitory computer-readable device having instructions to, when executed by power control circuitry, cause the power control circuitry to perform operations, comprising:
receive an instruction to transfer memory pages from a second memory circuitry to a first memory circuitry via a first memory controller circuitry communicatively coupled to the first memory circuitry and second memory controller circuitry communicatively coupled to the second memory circuitry;
cause first memory controller circuitry to:
transfer one or more least recently used (LRU) memory pages from the first memory circuitry to a persistent storage device; and
consolidate a plurality of memory pages remaining in the first memory circuitry to sequential locations within the first memory circuitry to provide a plurality of first memory segments;
cause second memory controller circuitry to:
transfer one or more least recently used (LRU) memory pages from the second memory circuitry to the persistent storage device; and
consolidate a plurality of memory pages remaining in the second memory circuitry to sequential locations within the second memory circuitry to provide a plurality of second memory segments;
cause the first memory controller circuitry and the second memory controller circuitry to transfer the plurality of second memory segments from the second memory circuitry to the first memory circuitry; and
decrease power applied to the second memory circuitry responsive to the second memory controller circuitry successfully completing the transfer of the second plurality of memory segments to the first memory circuitry.

12. The non-transitory computer-readable device of claim 11, wherein decrease power applied to the second memory circuitry includes one or more of:
cease clock signal transmission to the second memory circuitry over second channels;
remove power to the second memory circuitry;
disable automated self-refresh operations for the second memory circuitry; or
at least partially remove power to the second memory controller circuitry.

13. The non-transitory computer-readable device of claim 11, further comprising:
receive, by the power control circuitry, a command to re-apply power to the second memory circuitry; and
cause, by the power control circuitry, a transfer of at least a portion of the second plurality of memory segments from the first memory circuitry to the second memory circuitry, responsive to receipt of the command to re-apply power to the second memory circuitry.

14. The non-transitory computer-readable device of claim 11, wherein the instructions that cause the power control circuitry to receive an instruction to transfer memory pages from second memory circuitry data to first memory circuitry via first channels from second memory circuitry via the second channels further cause the power control circuitry to:
read bits from a power control register that stores configuration settings for the first memory circuitry and the second memory circuitry.

15. A system comprising:
a processor;
at least one memory controller configured to:
control read and write access to first memory circuitry via at least one first channel; and
control read and write access to second memory circuitry via at least one second channel; and
power control circuitry coupled to the at least one memory controller, the power control circuitry configured to:
cause the at least one memory controller circuitry to:
transfer one or more least recently used (LRU) memory pages from the first memory circuitry to a persistent storage device;
consolidate a plurality of memory pages remaining in the first memory circuitry to sequential locations within the first memory circuitry to provide a plurality of first memory segments;
transfer one or more least recently used (LRU) memory pages from the second memory circuitry to the persistent storage device;
consolidate a plurality of memory pages remaining in the second memory circuitry to sequential locations within the second memory circuitry to provide a plurality of second memory segments; and
transfer the plurality of second memory segments from the second memory circuitry to the first memory circuitry
power down the second memory circuitry responsive to the second memory controller circuitry successfully completing the transfer of the second plurality of memory segments to the first memory circuitry.

16. The system of claim 15, wherein the power control circuitry is further configured to:
receive a command to power-up the second memory circuitry; and
cause a transfer, from the first memory circuitry to the second memory circuitry of at least some of the plurality of second memory segments previously transferred from the second memory circuitry to the first memory circuitry, responsive to receipt of the command to power up to the second plurality of memory segments.

* * * * *